US009254735B2

(12) United States Patent
Spencer

(10) Patent No.: US 9,254,735 B2
(45) Date of Patent: Feb. 9, 2016

(54) TONNEAU COVER LATCH SYSTEM

(71) Applicant: Truxedo, Inc., Yankton, SD (US)

(72) Inventor: Michael R. Spencer, Hubbard, NE (US)

(73) Assignee: Truxedo, Inc., Yankton, SD (US)

( * ) Notice: Subject to any disclaimer, the term of this patent is extended or adjusted under 35 U.S.C. 154(b) by 263 days.

(21) Appl. No.: 13/962,091

(22) Filed: Aug. 8, 2013

(65) Prior Publication Data
US 2014/0042754 A1 Feb. 13, 2014

Related U.S. Application Data

(60) Provisional application No. 61/681,845, filed on Aug. 10, 2012.

(51) Int. Cl.
*E05C 9/10* (2006.01)
*B60J 7/185* (2006.01)
*B60J 7/02* (2006.01)
*B60J 7/14* (2006.01)
*B60J 7/19* (2006.01)

(52) U.S. Cl.
CPC .. *B60J 7/185* (2013.01); *B60J 7/02* (2013.01); *B60J 7/141* (2013.01); *B60J 7/198* (2013.01); *Y10T 292/0806* (2015.04)

(58) Field of Classification Search
USPC .......... 292/7; 296/100.17, 100.18, 100.07, 98
See application file for complete search history.

(56) References Cited

U.S. PATENT DOCUMENTS

| 5,460,423 | A * | 10/1995 | Kersting et al. .......... 296/100.18 |
| 6,575,520 | B1 | 6/2003 | Spencer |
| 6,619,719 | B1 | 9/2003 | Wheatley |
| 6,641,200 | B2 * | 11/2003 | Rusu ...................... B60J 7/1621 |
| | | | 296/100.07 |
| 6,719,353 | B1 | 4/2004 | Isler et al. |
| 6,808,220 | B2 | 10/2004 | Wheatley |
| 6,811,203 | B2 * | 11/2004 | Wheatley ................. B60J 7/102 |
| | | | 296/100.15 |
| 7,204,540 | B2 | 4/2007 | Wheatley |
| 7,207,540 | B2 | 4/2007 | Thomas |
| 7,484,788 | B2 | 2/2009 | Calder et al. |
| 7,537,264 | B2 | 5/2009 | Maimin et al. |
| 7,828,361 | B1 | 11/2010 | Spencer |
| 7,887,114 | B2 | 2/2011 | Spencer |
| 8,256,820 | B2 * | 9/2012 | Spencer ................. B60R 11/06 |
| | | | 296/37.6 |
| 9,073,417 | B1 * | 7/2015 | Smith ...................... B60J 7/104 |
| 2006/0255615 | A1 | 11/2006 | Malmberg et al. |

* cited by examiner

*Primary Examiner* — Mark Williams
(74) *Attorney, Agent, or Firm* — Harness, Dickey & Pierce, PLC

(57) ABSTRACT

A tonneau system for a pickup bed having a bracket system connectable with a side wall of the pickup bed having a ratchet receiving member, a tonneau cover assembly having a pivotal first cover section and a second section, and a latching system operably coupled between the tonneau cover assembly and the bracket system. The latching system includes a ratchet striker member operably coupled to the tonneau cover assembly selectively engageable with the ratchet receiving member of the bracket system to define a latched condition of the first cover section of the tonneau cover assembly relative to the bracket system. An actuation system is operably coupled to the latching system to permit actuation of the latching system. The actuation system includes an actuation lever operably coupled to a drive member and the drive member being coupled to the latching system for actuation of the ratchet striker member.

24 Claims, 23 Drawing Sheets

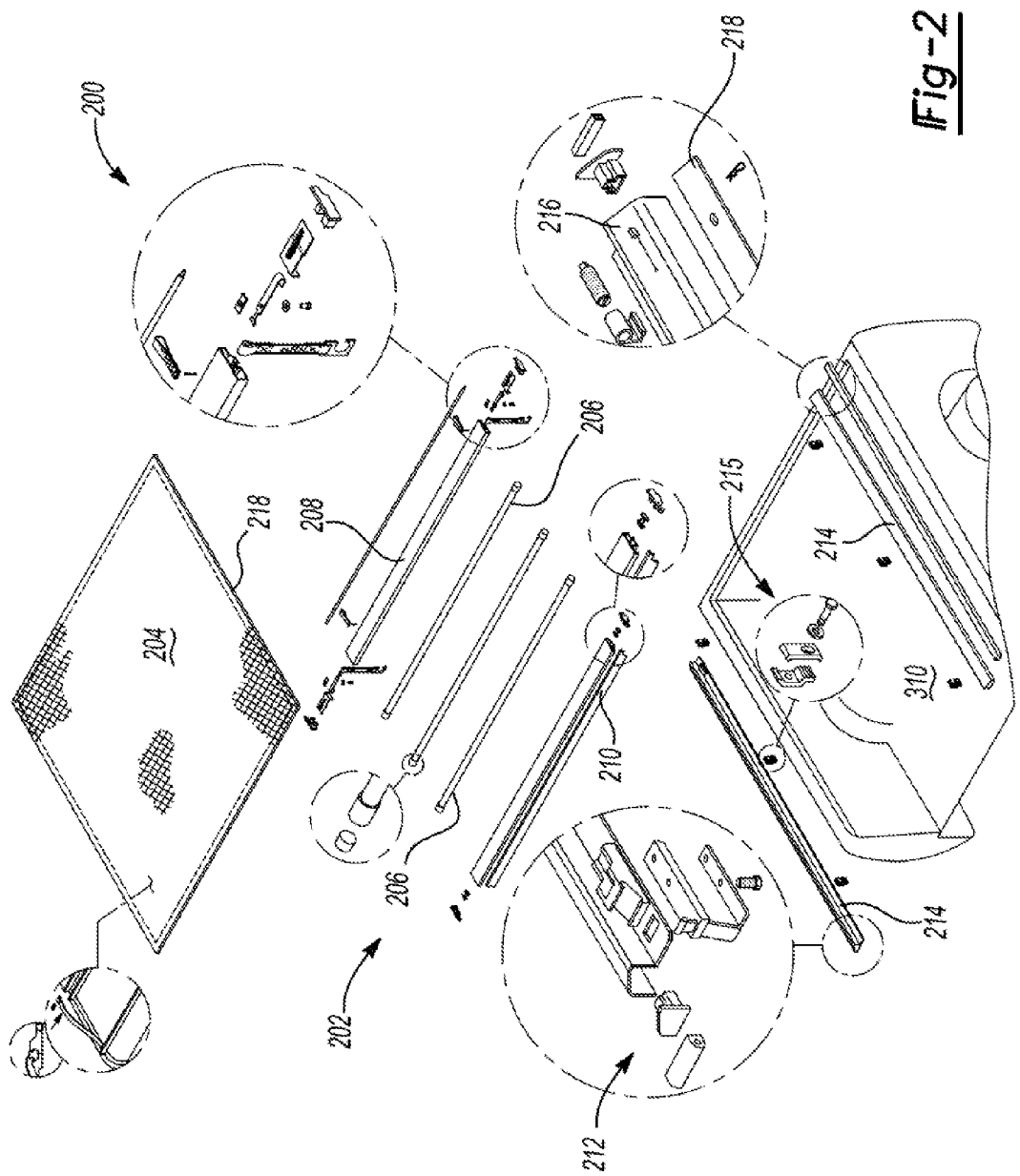

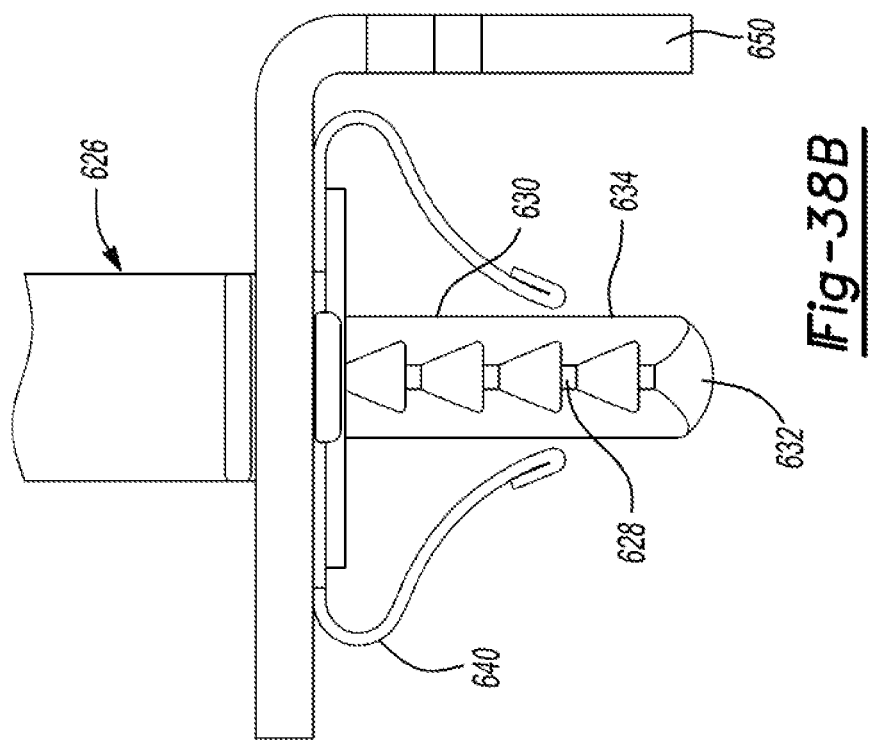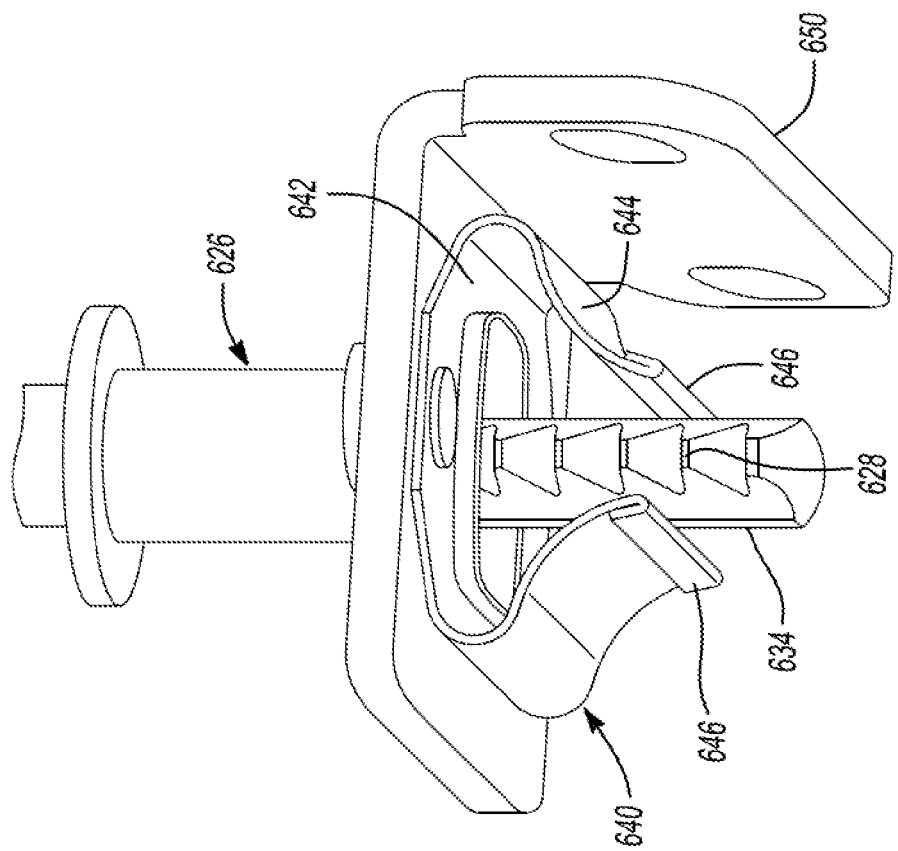

TONNEAU COVER LATCH SYSTEM

CROSS-REFERENCE TO RELATED APPLICATIONS

This application claims the benefit of U.S. Provisional Application No. 61/681,845, filed on Aug. 10, 2012. The entire disclosure of the above application is incorporated herein by reference.

FIELD

The present disclosure relates to coverings for pickup trucks and, more particularly, relates to a tonneau cover system having a latch mechanism and associated rail and striker assembly.

BACKGROUND

This section provides background information related to the present disclosure which is not necessarily prior art.

Tonneau cover systems have been used for a number of years to cover the cargo box of pickup trucks against dirt, debris, and other environmental contaminants and to improve the aesthetic quality thereof. Current tonneau cover systems often employ a soft, often rollable, cover or a hard, often foldable, cover as the main covering means. In some applications, a VELCRO® hook-and-loop fastening system can couple between the soft tarp of the tonneau cover and the side walls of the cargo box of the pickup truck. This arrangement permits the tarp to be coupled to the cargo box to conceal the contents thereof or, alternatively, to be rolled up or otherwise removed to reveal the contents of the cargo box of the pickup truck.

In many applications, a rail system is used that couples to the side walls of the cargo box of the pickup truck. This rail system may serve as a convenient attachment system for coupling the cover to the cargo box. However, in many conventional applications, the connection system that permits connection of the cover to the side rails and, thus, to the side walls of the cargo box can be cumbersome or require complex attachment and/or detachment processes. Moreover, in some conventional applications, the connection system may prevent or inhibit access to the front or header portion of the cargo box. That is, in some applications, the cover must be removed from the rear first before unlatching in a forward direction (relative to the vehicle). Although there have been attempts to provide access to the front or header portion of the cargo box direction in some tonneau cover systems, these attempts have not always provided convenient access while simultaneously providing sufficient retention when closed. In fact, in some applications, retention may not provide longitudinal, transverse, and vertical restraint (relative to the vehicle). Still further, in some application, attachment of the header can involve a cumbersome process of engaging clamps or other retention systems that are difficult and subject to failure.

Accordingly, there exists a need in the relevant art to provide a tonneau cover system capable of overcoming the disadvantages of the prior art. Additionally, there exists a need in the relevant art to provide a tonneau cover system, and in particular a latch mechanism and associated rail and striker assembly capable of quickly, simply, and reliably coupling the header portion of the tonneau cover system to the vehicle. In some embodiments, this latch mechanism can further aid in retaining the header portion in all three degrees of direction (longitudinal, transverse, and vertical) and can permit varied adjustment and/or space accommodation in the vertical direction.

SUMMARY

This section provides a general summary of the disclosure, and is not a comprehensive disclosure of its full scope or all of its features.

According to the principles of the present teachings, a tonneau system for a pickup bed is provided having advantageous construction. The tonneau system includes a bracket system connectable with a side wall of the pickup bed having a ratchet receiving member, a tonneau cover assembly having a pivotal first cover section and a second section, and a latching system operably coupled between the tonneau cover assembly and the bracket system. The latching system includes a ratchet striker member operably coupled to the tonneau cover assembly selectively engageable with the ratchet receiving member of the bracket system to define a latched condition of the first cover section of the tonneau cover assembly relative to the bracket system. An actuation system is operably coupled to the latching system to permit actuation of the latching system. The actuation system includes an actuation lever operably coupled to a drive member and the drive member being coupled to the latching system for actuation of the ratchet striker member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is an exploded view of the soft-type tonneau cover system according to the present teachings;

FIGS. 38A and 38B are enlarged side views of the ratchet latch system in a ratchet disengaging position.

Corresponding reference numerals indicate corresponding parts throughout the several views of the drawings.

DETAILED DESCRIPTION

Figure 1A:
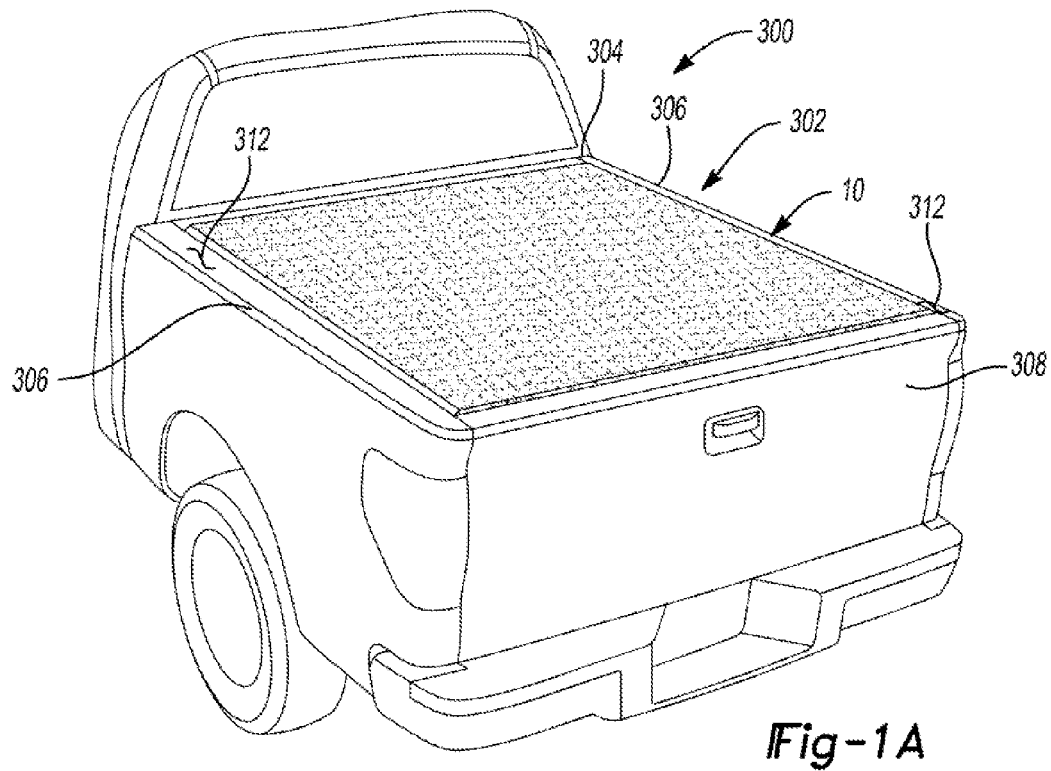
FIG. 1A is a perspective view of a pickup bed of a truck having a soft-type tonneau cover system according to the present teachings in an extended position.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1B:
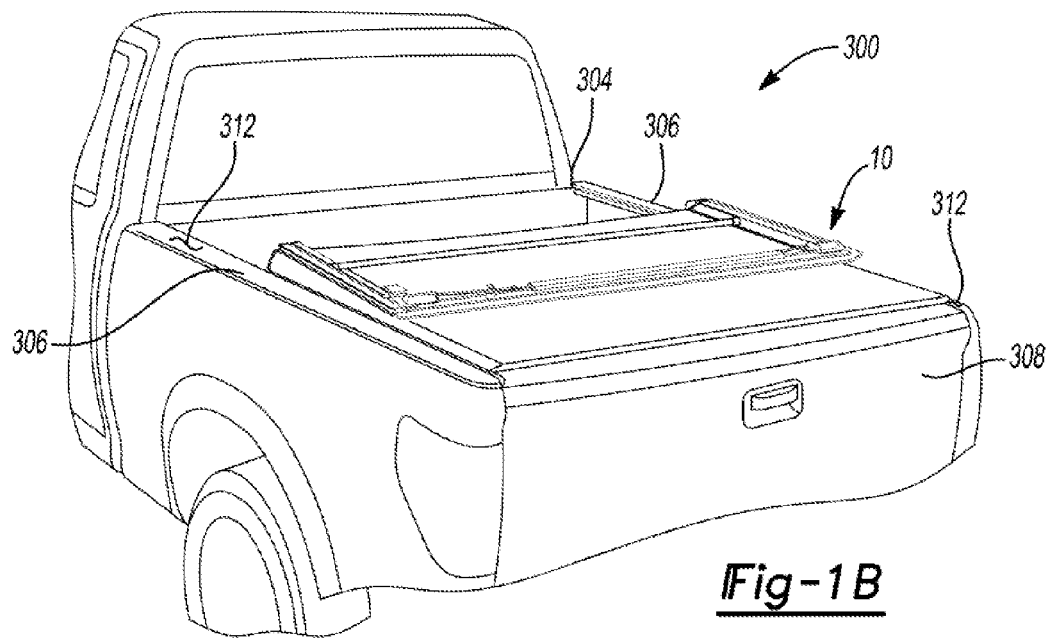
FIG. 1B is a perspective view of a pickup bed of a truck having a hard-type tonneau cover system according to the present teachings in a partially retracted position.

With reference to the several figures, a quick attachment system 10 and a latch system 510, 610 will be described in connection with a tonneau cover system 200 of a pickup or other vehicle 300. The quick attachment system 10 is particularly well suited to simplify the mounting, removal, and operation of the header structure that supports the tonneau cover (which will be described in more detail herein). Although aspects of the present teachings are presented in connection with a soft type tonneau system, as depicted in FIG. 1A, it should be recognized that the present teachings can be used in conjunction with a hard or rigid type tonneau system, as depicted in FIG. 1B. Therefore, description and discussion relating to the present tonneau system should not be interpreted as limiting the scope of the present application to only such roll up type covers and systems or only hard type tonneau systems.

Although the quick attachment system 10 and the latch system 510, 610 will be described in connection with a header structure, it should be recognized that the design and construction of the quick attachment system 10 and latch system 510, 610 can be applicable and useful in any one of a number of connection scenarios, including connection of other members separate from the header structure.

According to some embodiments of the present teachings, the tonneau cover system, including quick attachment system 10 and latch system 510, 610, is provided for use with pickup 300. The tonneau cover system 200 enables pickup bed 302 to be selectively concealed or revealed based on the positioning of tonneau cover system 200 relative to pickup bed 302, as illustrated throughout the figures.

Briefly, pickup bed 302 of pickup 300 can comprise a plurality of side walls, namely a front wall 304, a pair of side walls 306, and a rear wall or tailgate 308. These walls extend vertically from a bottom surface 310 (FIG. 2). Traditionally, walls 304, 306, 308 generally extend to a common height above bottom surface 310 and define an upper, generally flat, surface 312 extending about the top of walls 304, 306, 308.

Bracket System

Figure 3:
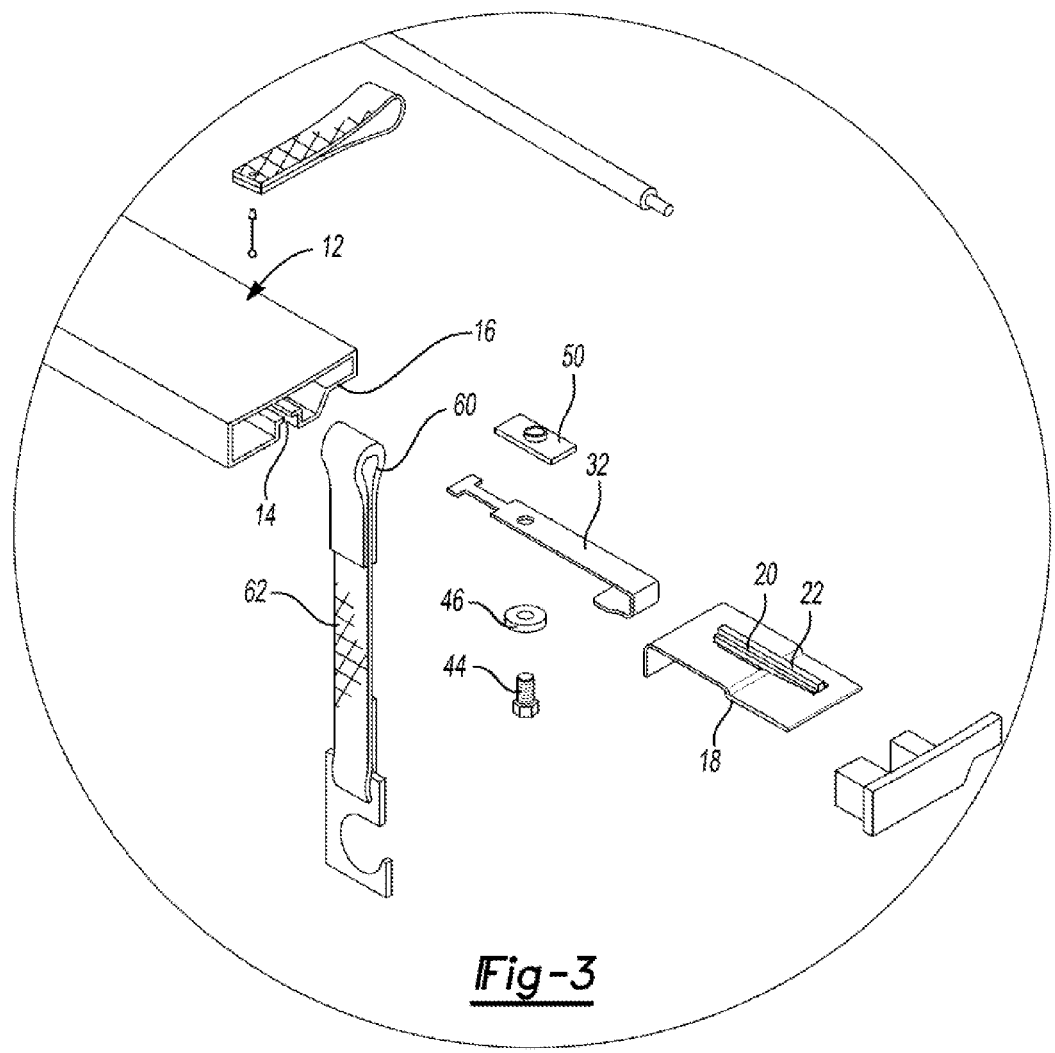
FIG. 3 is an enlarged exploded view of the spring retainer system according to the present teachings.

In some embodiments, as illustrated in FIGS. 1-3, tonneau cover system 200 can comprise a bracket system 202 for mounting to any one or more walls 304, 306, 308. It should be understood that portions of bracket system 202 may be referred to as being part of quick attachment system 10 and/or latch system 510, 610 as the members of each system work closely with one another and thus are not easily separated for discussion.

In some embodiments, bracket system 202 can be mounted to side walls 306 to provide support for tonneau cover system 200. More particularly, in some embodiments, tonneau cover system 200 can comprise a soft tonneau cover 204 that is supported by a plurality of optional cross-vehicle bows 206 that extend through and/or are coupled to tonneau cover 204. Each of the plurality of cross-vehicle bows 206 can comprise end caps and/or other hardware, if desired. A front header assembly 208 can be coupled to tonneau cover 204 for coupling tonneau cover 204 to bracket system 202 and, more particularly, front wall 304 of pickup 300. Front header assembly 208 will be described in detail herein. A rear header assembly 210 can similarly be coupled to tonneau cover 204 for coupling tonneau cover 204 to bracket system 202 and, more particularly, rear wall or tailgate 308 of pickup 300. Rear header assembly 210 is selectively connectable to tailgate 308, or at least side rails 214 that are coupled to side walls 306, via a releasable header stop and latch assembly 212. It should be noted that although elements of bracket system 202 are described as part of bracket system 202, it should be understood that these elements could also be considered part of quick attachment system 10. Therefore, portions of bracket system 202 can be considered part of quick attachment system 10.

With continued reference to FIG. 2, in some embodiments, side rails 214 can extend generally the length of side walls 306 of pickup bed 302. In some embodiments, side rails 214 can be fixedly coupled to side walls 306 via a clamp assembly 215 (see FIG. 2). However, in some embodiments, side rails 214 can be coupled to a rotatable portion of tonneau system 200 and selectively coupled with an adapter rail that is fixedly coupled to side walls 306 via clamp assembly 215, as will be discussed herein. Clamp assembly 215 can be made of aluminum and can comprise a pair of clamp members that are fastened together to clampingly engage a portion, such as a flange, of side walls 306. An example of a clamping system can be found in commonly-assigned U.S. patent application Ser. No. 10/331,711, entitled "Roll Up Tonneau Cover System." The disclosure of this application is incorporated herein by reference.

As illustrated in FIG. 2, side rails 214 can be mounted to surface 312 of walls 304, 306, 308, especially side walls 306. In some embodiments, side rails 214 comprise an inclined surface 216 having a fastener system 218, such as a hook and loop fastening system, coupled thereto. A complementary fastener piece can extend alongside portions of soft tonneau cover 204 for releasably securing soft tonneau cover 204 to side rails 214.

Front Header System

Figure 4:
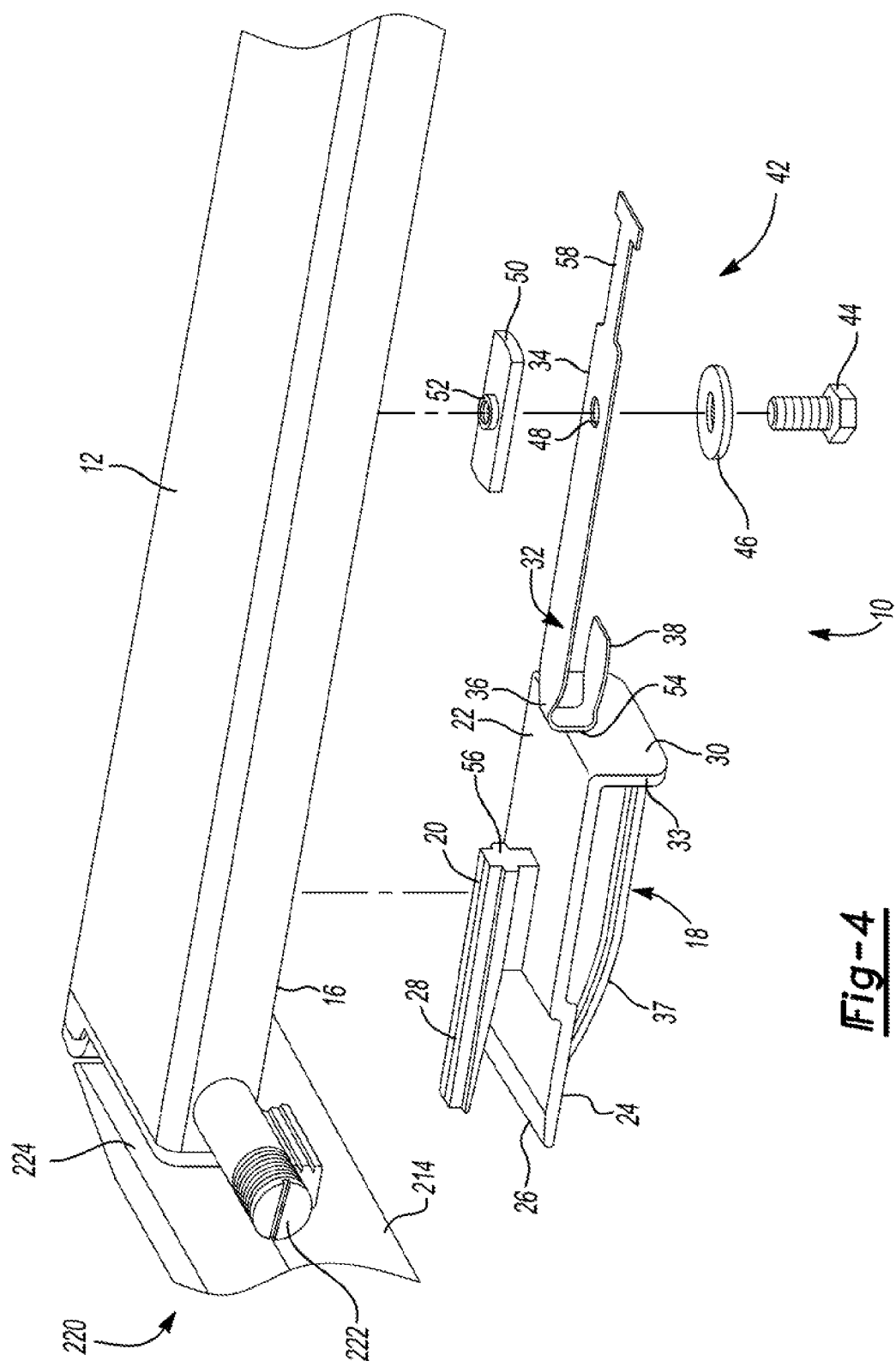
FIG. 4 is an exploded view of the retainer system according to some embodiments of the present teachings.
Figure 5:
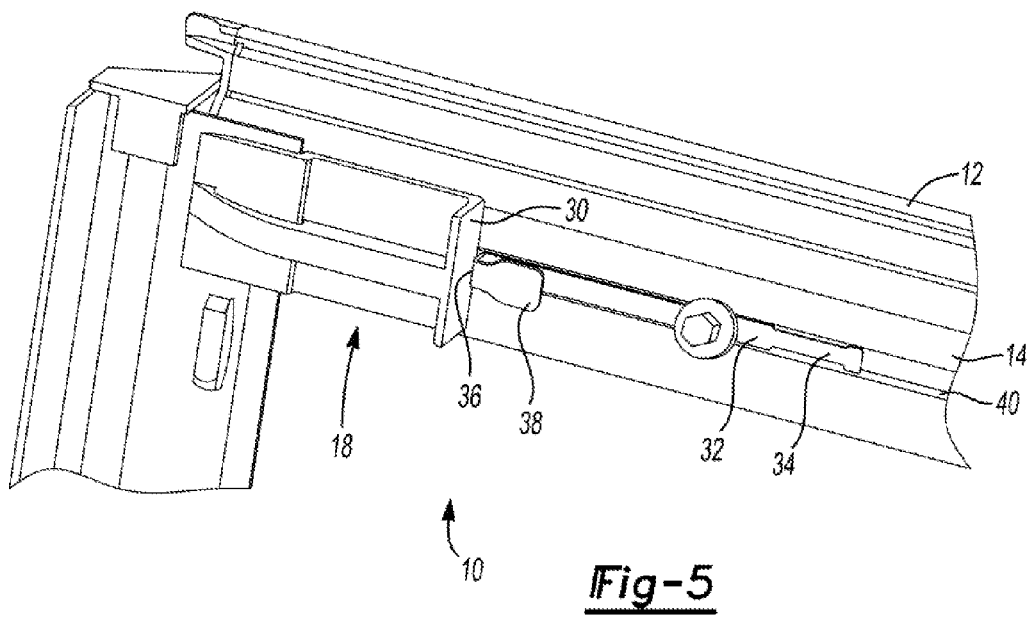
FIG. 5 is a bottom perspective view of the retainer system according to some embodiments of the present teachings in a latched position.
Figure 6:
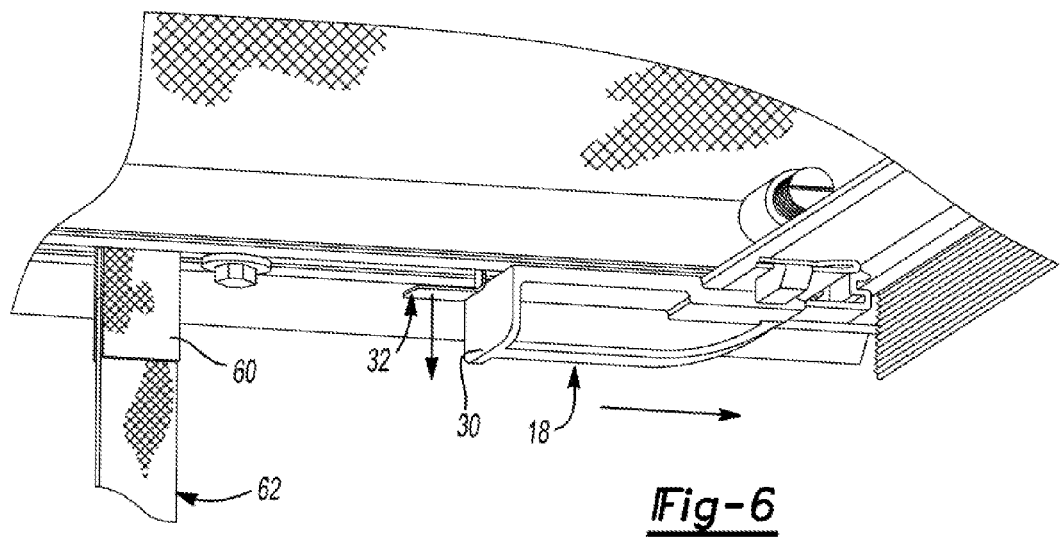
FIG. 6 is a bottom perspective view of the retainer system according to some embodiments of the present teachings in a latched position.
Figure 7:
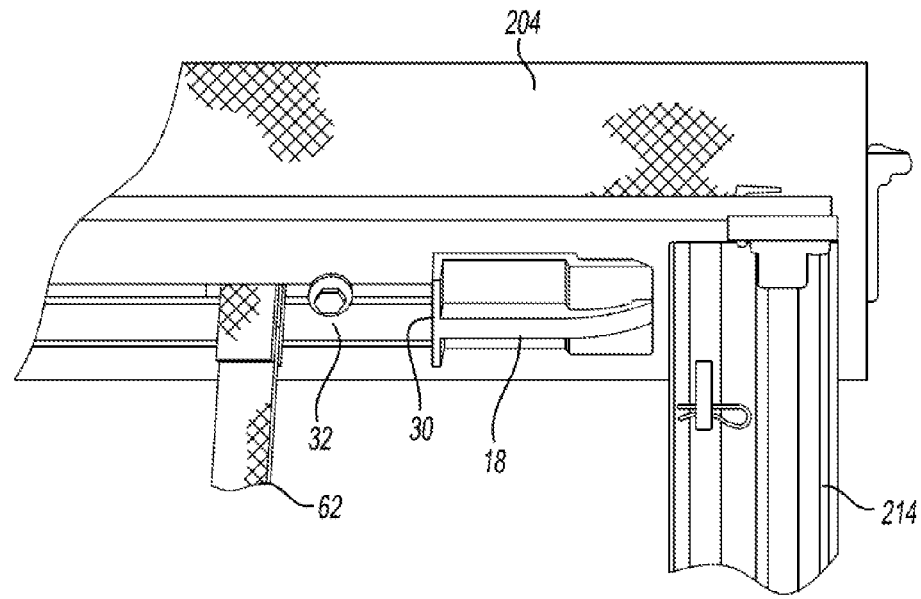
FIG. 7 is a lower perspective view of the retainer system according to some embodiments of the present teachings in a released position.
Figure 8:
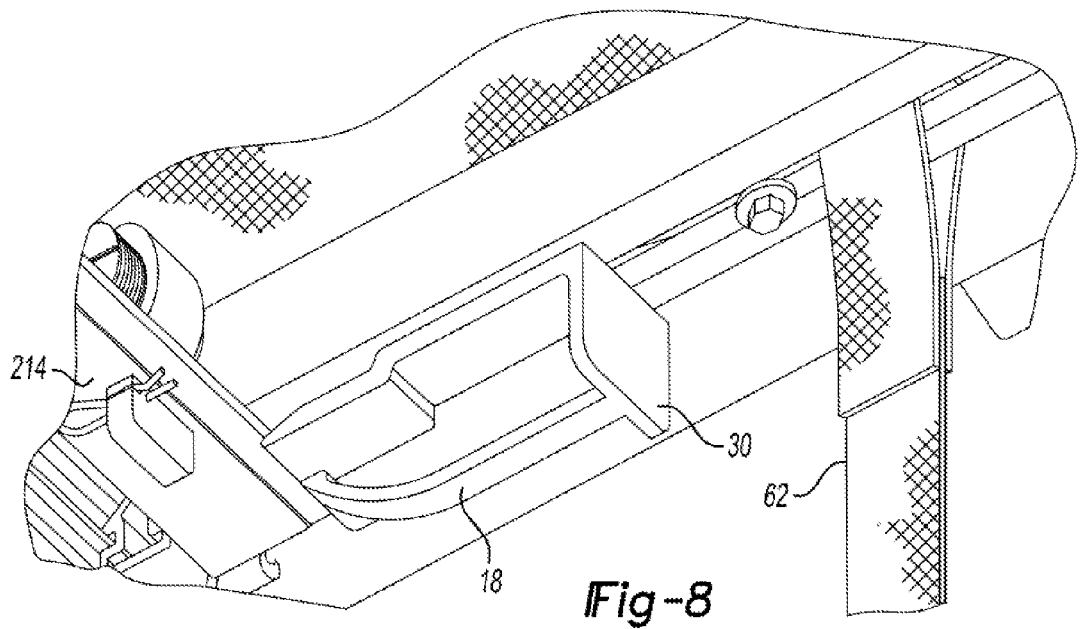
FIG. 8 is an enlarged perspective view of the retainer system according to some embodiments of the present teachings in a released position.
Figure 9:
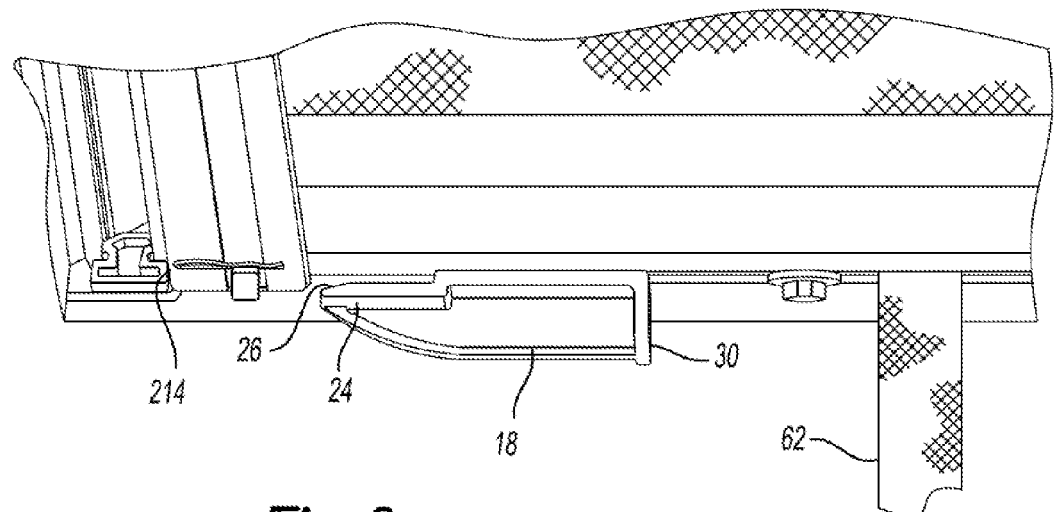
FIG. 9 is a side perspective view of the retainer system according to some embodiments of the present teachings in a released position.
Figure 10:
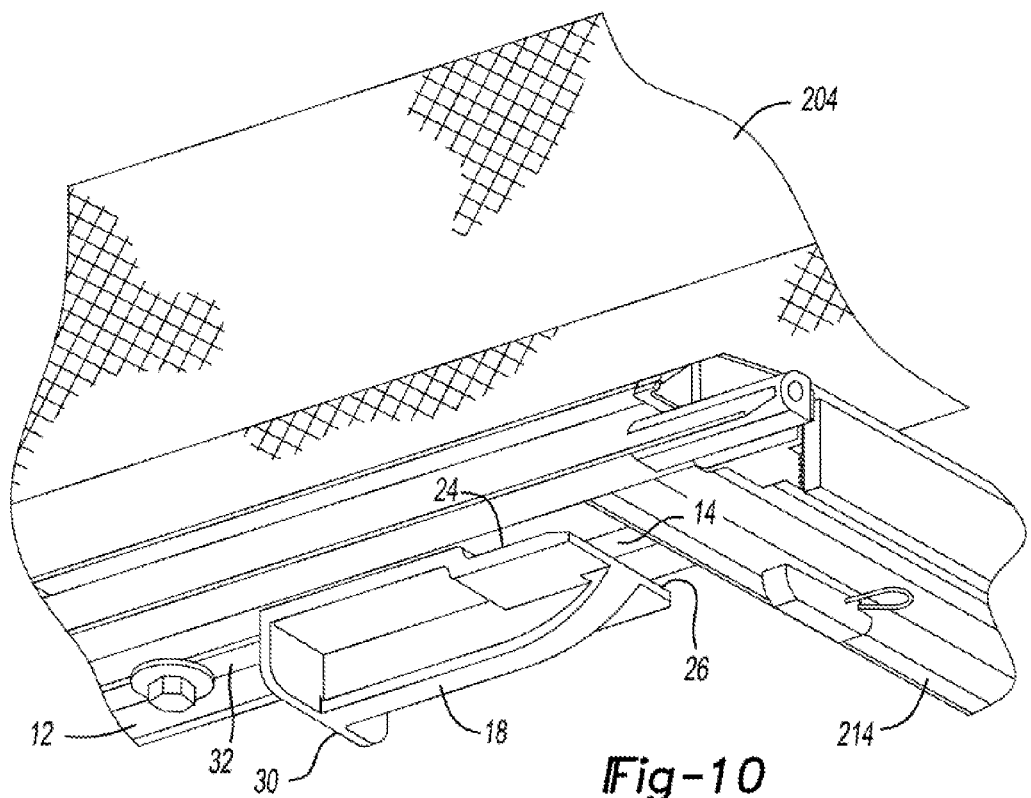
FIG. 10 is a lower perspective view of the retainer system according to some embodiments of the present teachings in a released position.
Figure 11:
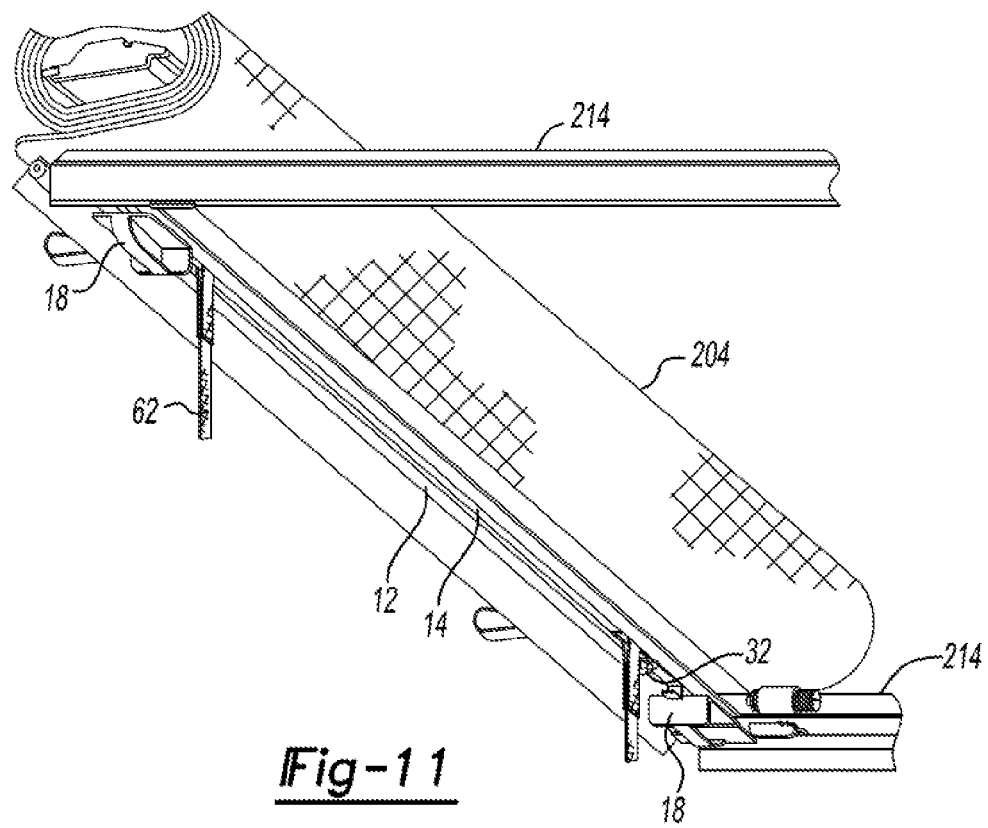
FIG. 11 is a perspective view of the retainer system and tonneau cover in a rolled positioned according to some embodiments of the present teachings.
Figure 12:
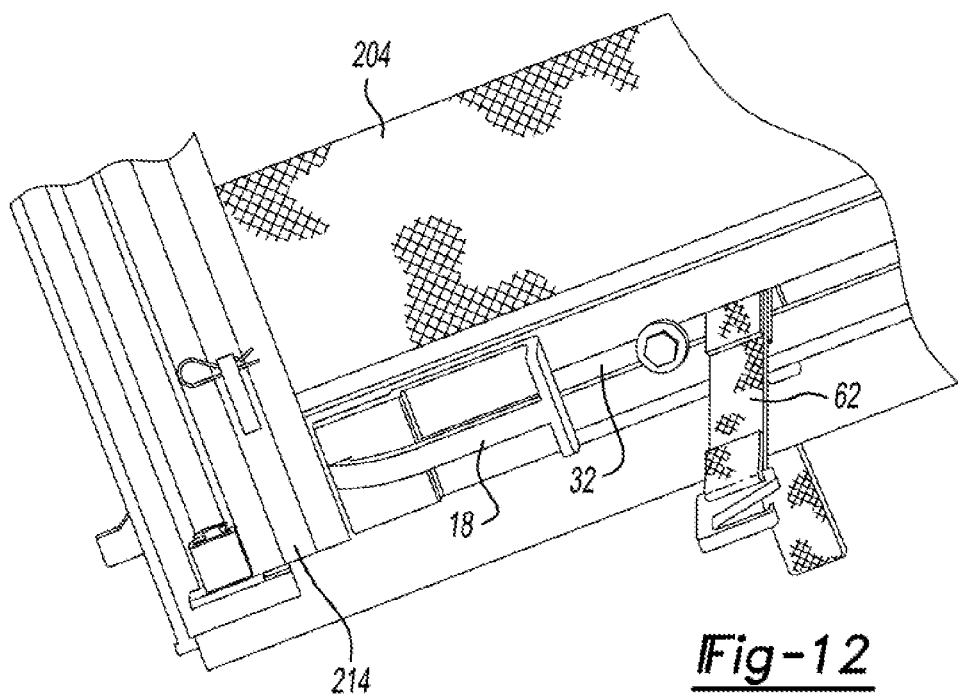
FIG. 12 is a perspective view of the retainer system according to some embodiments of the present teachings in a released position and the spring clip in a retracted position.
Figure 13:
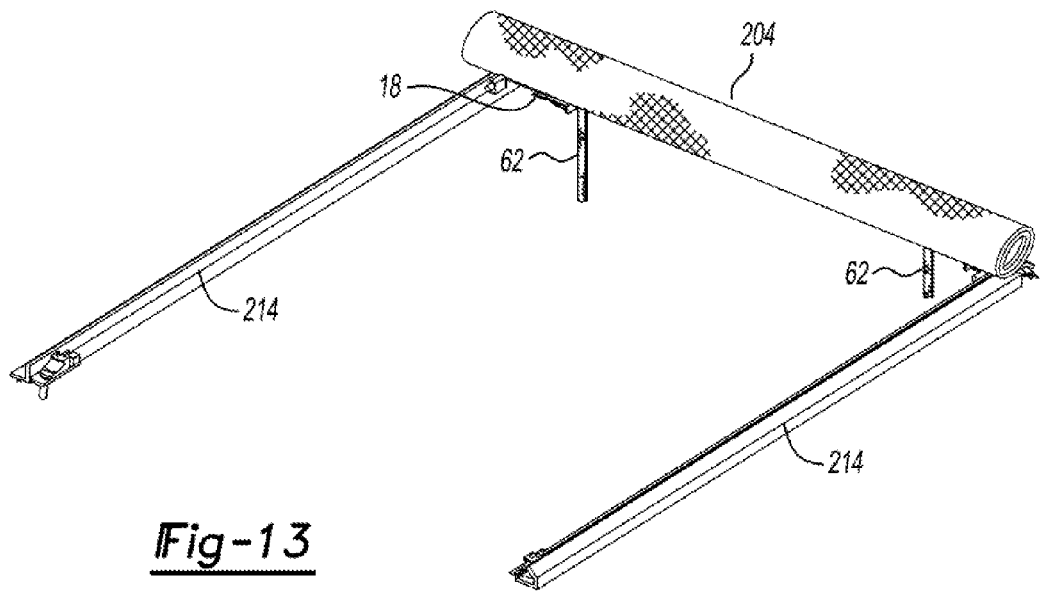
FIG. 13 is a perspective view of the retainer system according to some embodiments of the present teachings in a rolled position.
Figure 14:
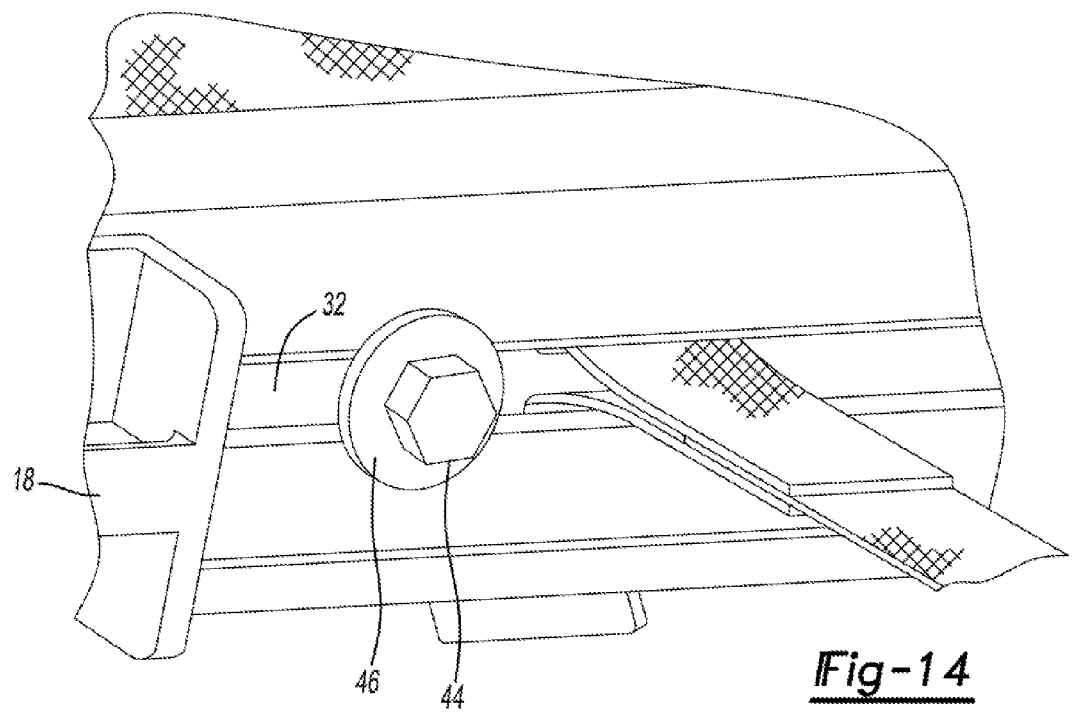
FIG. 14 is an enlarged perspective view of the spring clip of the retainer system according to some embodiments of the present teachings.
Figure 15:
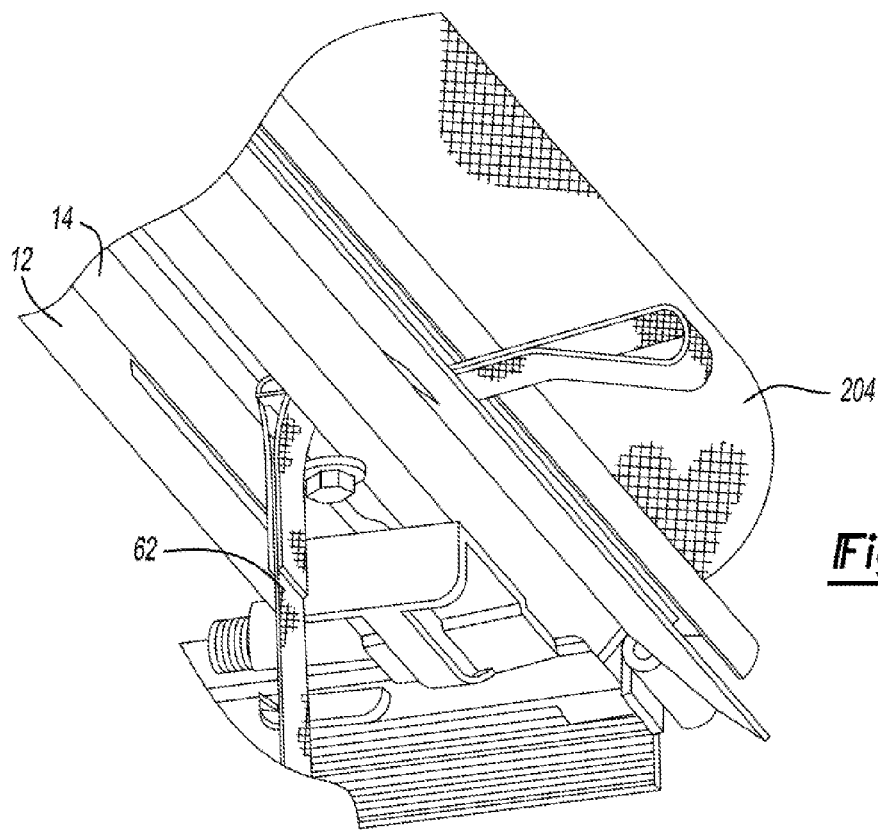
FIG. 15 is a perspective view of the spring clip of the retainer system according to some embodiments of the present teachings in a released position.
Figure 16:
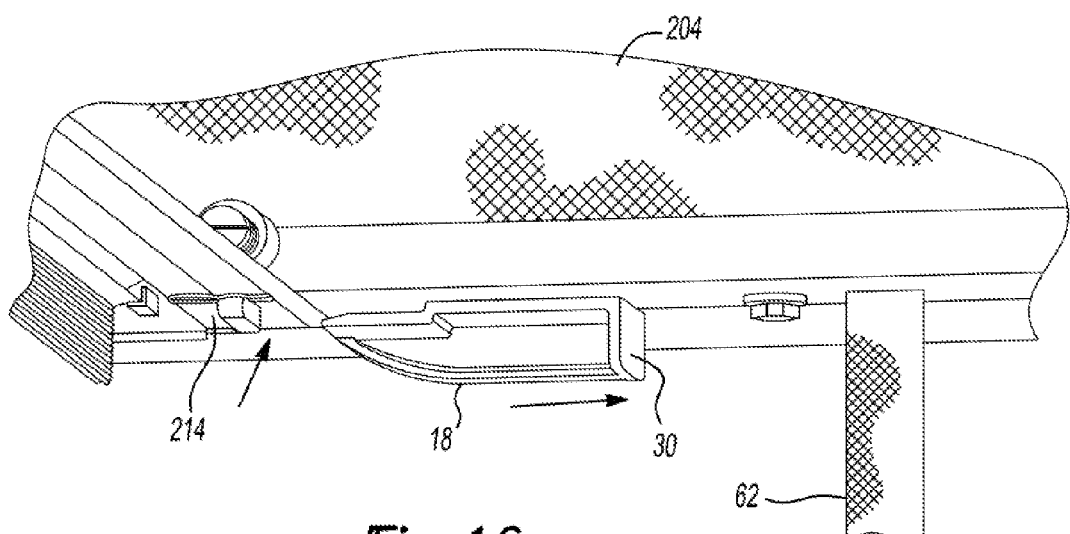
FIG. 16 is a perspective view of the retainer system according to some embodiments of the present teachings.

With particular reference to FIGS. 3-22, front header assembly 208 will now be described in detail. In some embodiments, front header assembly 208 can comprise a front header 12 removably coupled in a cross-vehicle direction to side rails 214. In some embodiments, front header 12 can be removably coupled to side rails 214 and further include (as illustrated in FIG. 4), a front header adjustment system 220 having an adjustment member 222 that is threadingly engaged with a mount member 224 extending from side rail 214. Front header adjustment system 220 can extend a variable distance past mount member 224 and engage front header 12 to position front header 12 in a desired fore and aft location.

Sliding Latch System—Three Degree Control

Figure 17:
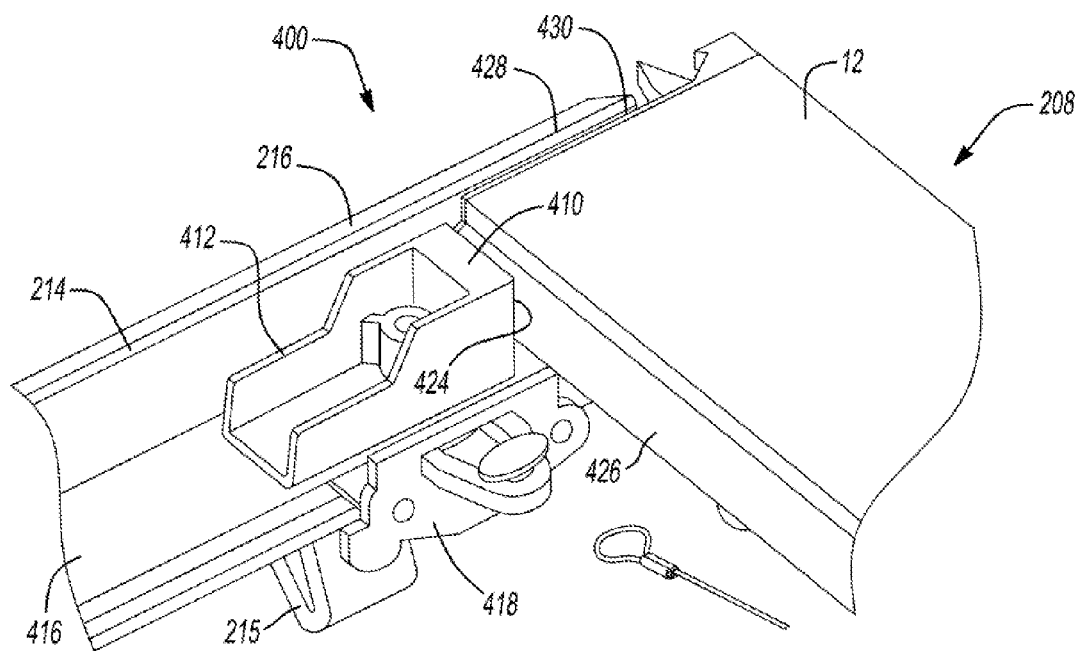
FIG. 17 is a perspective view of the header stop and header assembly according to some embodiments of the present teachings.
Figure 18:
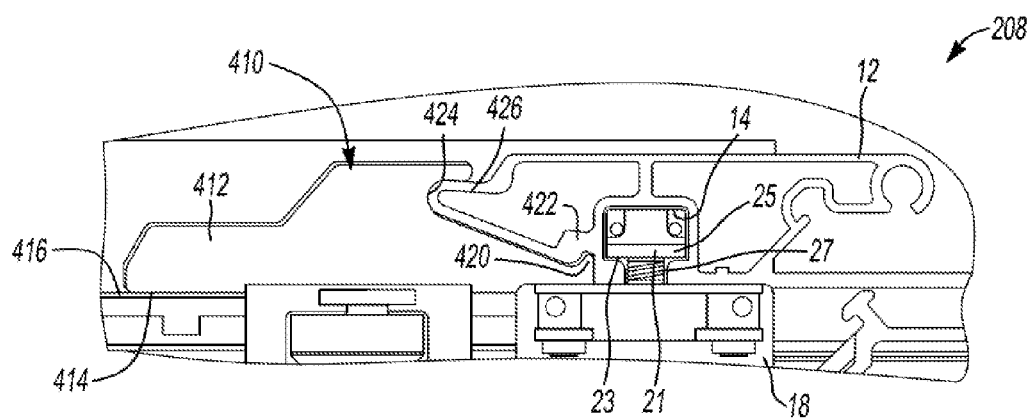
FIG. 18 is a partial cross-sectional view illustrating the header stop and header assembly of FIG. 17.
Figure 19:
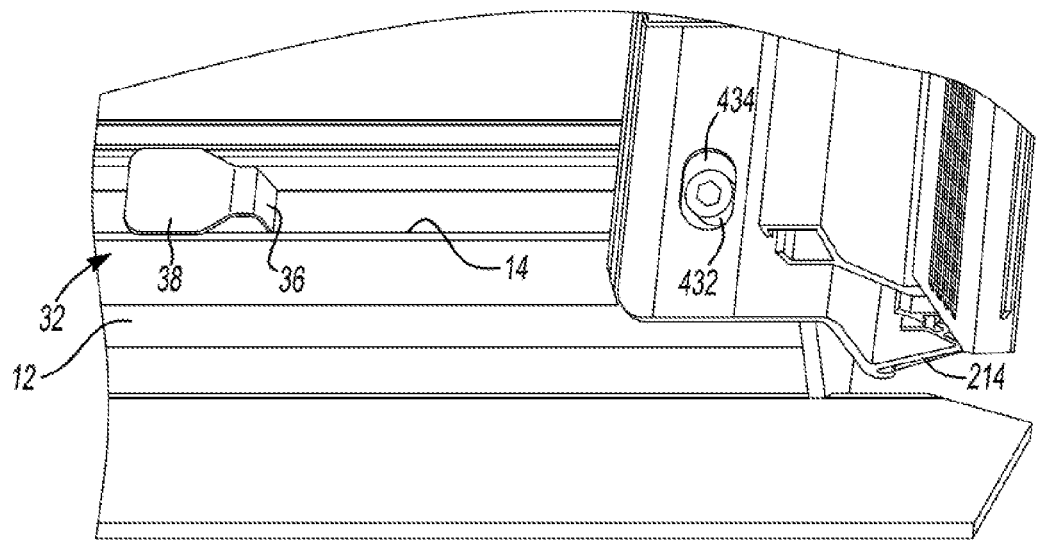
FIG. 19 is a bottom perspective view illustrating the retainer system according to some embodiments of the present teachings with portions removed for clarity.
Figure 20:
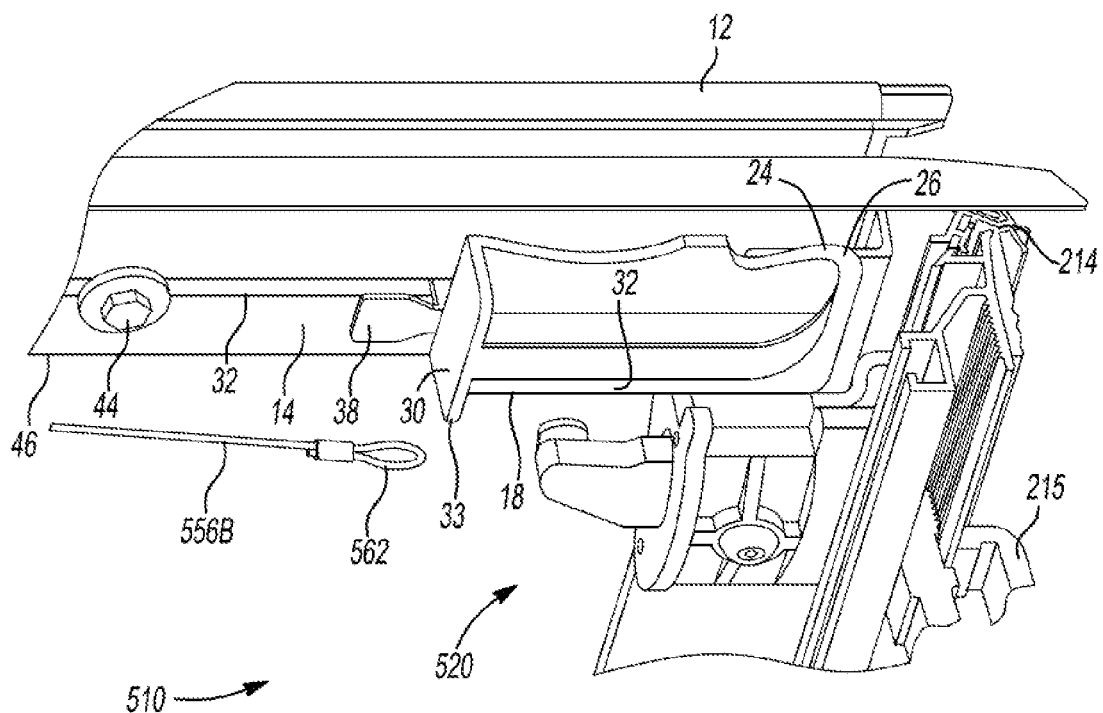
FIG. 20 is a bottom perspective view illustrating the retainer system according to some embodiments of the present teachings in a latched position.
Figure 21:
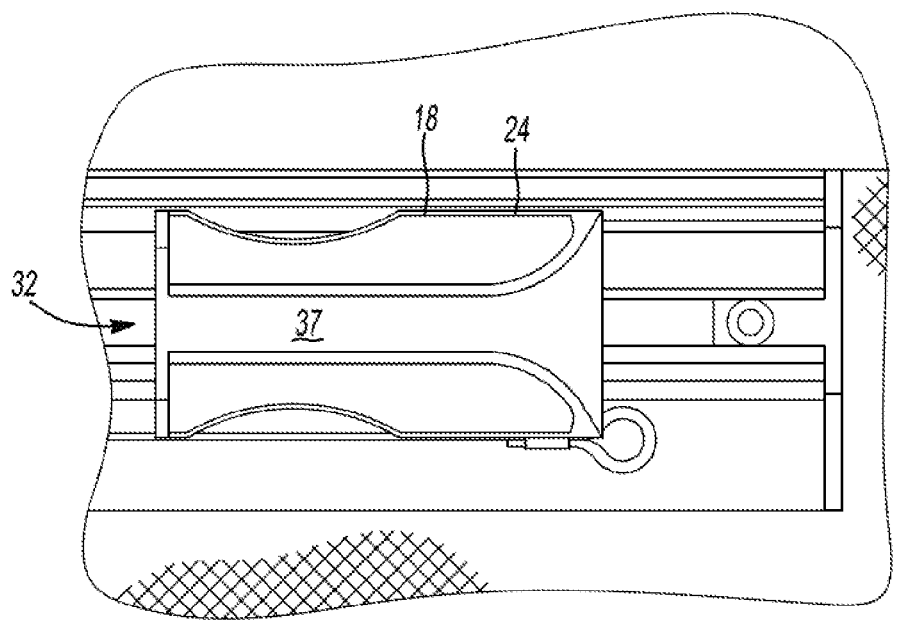
FIG. 21 is a bottom view illustrating the retainer system according to some embodiments of the present teachings.

In some embodiments, as illustrated in FIGS. 17-19, front header assembly 208 (and, as described herein, rear header assembly 210) can be retained or otherwise reliably coupled to bracket system 202 such that the respective header assembly can be generally coupled to the vehicle in all three degrees of direction (longitudinal relative to the vehicle, transverse relative to the vehicle, and vertical). More particularly, as illustrated in the figures, a header retaining system 400 can be used to retain the header assembly along the aforementioned degrees of direction. In some embodiments, header retaining system 400 can comprise a header stop member 410 fixedly connected to at least one of side rails 214 (FIGS. 17 and 18). Header stop member 410 can comprise an upper portion 412 having a generally flat bottom surface 414 engageable with a corresponding flat surface 416 formed on side rail 214. Upper portion 412 of header stop member 410 can be fixedly retained on side rail 214 using any one of a number of retention methods, such as fasteners, dowels, slots, keyholes, or clamps. In some embodiments, upper portion 412 can be joined with a corresponding lower portion 418 (FIG. 17), wherein the combination can engage and be retained relative to side rail 214 using notches, friction, or other method. It should be appreciated that lower portion 418 can comprise a portion of slam latch mechanism 510, as will be discussed herein. In some embodiments, the position of header retaining system 400 and particularly header stop member 410 alongside rail 214 can be adjustable to permit fine adjustment of the system for a particular pickup bed application.

In some embodiments, header stop member 410 can comprise one or more features operable to engage front header assembly 208 or front header 12 (or rear header assembly 210) to generally prevent or inhibit movement of front header assembly 208 in at least one of the three degrees of direction. As illustrated in FIG. 18, in some embodiments, header stop member 410 can comprise a first feature 420 engageable with a corresponding second feature 422 of front header 12 to generally prevent or inhibit movement of front header 12 in a longitudinal direction relative to the vehicle (i.e. fore and aft). First feature 420 can include an upstanding finger complementarily sized and shaped to be received within a channel or slot of second feature 422. It should be recognized that any one of a number of shaped, slots, channels, or features could be used that generally inhibit fore and aft movement.

Similarly, as illustrated in FIG. 18, in some embodiments, header stop member 410 can comprise a third feature 424 engageable with a corresponding fourth feature 426 of front header 12 to generally prevent or inhibit movement of front header 12 in a vertical direction relative to the vehicle (i.e. up and down). Third feature 424 can include an elongated slot complementarily sized and shaped receive an elongated finger of fourth feature 426. It should be recognized that any one of a number of shaped, slots, channels, or features could be used that generally inhibit vertical movement. As will be discussed herein, vertical movement of front header 12 can further be prevented or at least inhibited using additional connection members.

With particular reference to FIG. 17, in some embodiments lateral, cross-vehicle, or transverse movement of front header 12 can be prevented or at least inhibited through the use of one or more retaining features. In some embodiments, transverse movement of front header 12 can be inhibited by providing an upstanding wall or feature 428 (FIG. 17) extending from side rail 214 that is generally closely spaced relative to an abutment end 430 of front header 214. However, in some embodiments, an arrangement similar to first feature 420/second feature 422 or third feature 424/fourth feature 426 can be used. In particular, such features could be formed in header stop member 410 and front header 12, disposed in a general fore/aft direction that would prevent transverse movement of front header 12. As such, it should be appreciated that front header 12 can be positively retained relative to side rails 214 and thus pickup bed 302 in all three degrees of direction. In some embodiments, as illustrated in FIG. 19, front header 12 can comprise a dowel 432 extending from an underside thereof that is positioned to extend at least partially through a slot 434 formed in side rail 214. Dowel 432 and slot 434 can be complementarily sized and/or shaped to limit longitudinal and/or transverse movement of front header 12 relative to side rail 214 and, thus, vehicle 300.

Header Adjustment System

As illustrated in FIG. 4, tonneau cover system 200 can comprise a front header adjustment system 220 having an adjustment member 222 that is threadingly engaged with a mount member 224 extending from side rail 214. Front header adjustment system 220 can extend a variable distance past mount member 224 and engage front header 12 to position front header 12 in a desired fore and aft location.

Channel System

Front header 12 can, in some embodiments, define a planar structure having a centrally-disposed T-shaped or cross-shaped channel 14 extending along an underside 16 thereof. It should be recognized that alternative shapes can be used. Channel 14 of front header 12 can be shaped and sized to slidably receive a slidable header retaining member 18. As illustrated in FIGS. 3 and 4, in some embodiments, header retaining member 18 can comprise a slot guide 20 extending upward from a top surface 22. As illustrated in FIG. 4, slot guide 20 can comprise a T-shaped or cross-shaped guide that is sized to be slidably received within channel 14 of front header 12. However, in some embodiments, as illustrated in FIG. 18, header retaining member 18 can comprise a channel follower member 21 that is fastened or otherwise joined with header retaining member 18. As illustrated in FIG. 18, channel follower member 21 can comprise a generally flat face 23 and body section 25 that is sized to be slidably retained within channel 14 of front header 12. In some embodiments, a biasing member 27 can be disposed between channel follower member 21 and the remaining portion of header retaining member 18 to space channel follower member 21 apart therefrom. The fastened connection between channel follower member 21 and the remaining portion of header retaining member 18 can be adjusted (via the fastener) to adjust the distance therebetween and, thus, adjust the ease of sliding header retaining member 18 within channel 14 of front header 12. It should be recognized that slot guide 20 and channel follower member 21 both serve to provide a strong, reliable connection between header retaining member 18 and front header 12. This connection will serve to help retaining front header 12 and thus reliably coupling the header portion of the tonneau cover system to the vehicle in all three degrees of direction (longitudinal, transverse, and vertical).

Header retaining member 18 can further comprise a distal engaging portion 24 having a tapered end portion 26. Distal engaging portion 24 can be offset or spaced apart a distance from top surface 22 such that, as illustrated in the several figures, header retaining member 18 can be slid outwardly or outboardly (in a cross-vehicle direction) to engage or capture a portion of side rail 214 between distal engaging portion 24 and underside 16 of front header 12. In some embodiments, slot guide 20 can comprise a cantilevered portion 28 that can further extending within channel 14 and further extend outboardly to engage or capture a portion of side rail 214.

On an opposing end of header retaining member 18 from distal engaging portion 24 is a proximal abutment portion 30. Proximal abutment portion 30 can be shaped to define any shape that is both comfortable for gripping by a user and reliable for engagement with a header retaining member lock 32. Proximal abutment portion 30 can include a flange portion 33 for gripping, if desired. Still further, header retaining member 18 can comprise one or more reinforcement members 37 for providing enhanced structural integrity. Header retaining member 18 can be made of any conducive material, including plastic, fiberglass, aluminum, and the like.

Spring Lock

Quick attachment system 10 can further comprise header retaining member lock 32 being partially disposed with channel 14 of front header 12 (see FIGS. 5, 6, 19, 20, 22, and 23).

Header retaining member lock 32 can comprise a body portion 34, and elbow portion 36, and an enlarged head portion 38. Body portion 34 is sized to be slidably received within channel 14 of front header 12, yet remained captured within channel 14. That is, a width of body portion 34 of header retaining member lock 32 is less than a maximum width of channel 14 and greater than a width of the exposed slot width 40 of channel 14 (see FIG. 5).

Header retaining member lock 32, in some embodiments, can be coupled to front header 12 in a desired location via a fastening system 42. In some embodiments, as illustrated in FIGS. 3-5, 14, 20, 22, and 23, fastening system 42 can comprise a fastener 44 (e.g. cap screw), a washer 46, an aperture 48 formed in body portion 34 of header retaining member lock 32, and a weld nut 50 having a threaded aperture 52 formed therein. During installation, weld nut 50 can be fixedly coupled to body portion 34 of header retaining member lock 32 adjacent aperture 48 and header retaining member lock 32 can be slidably disposed within channel 14 of front header 12. Fastener 44, including washing 46, can be threadedly engaged with weld nut 50 from an exterior side of front header 12 such that, upon tightening, fastening system 42 exerts a clamping force upon front header 12 to maintain header retaining member lock 32 in a predetermined position.

In this position, elbow portion 36, having a width less than the exposed slot width 40 of channel 14, can extend from body portion 34 (which is contained within channel 14) to enlarged head portion 38 (which is external to channel 14). Elbow portion 36 can be turned or otherwise shaped to define a contacting surface 54, such as a flat surface for example, for contact with abutment portion 30 of header retaining member 18. Body portion 34 of header retaining member lock 32 can define a length sufficient to permit elastic deformation during operation; namely, to permit elastic deformation of body portion 34 through application of an upward force applied to enlarged head portion 38 by a user to urge header retaining member lock 32 into a retracted and unlocked position. In this retracted and unlocked position, enlarged head portion 38 can be nested above header retaining member 18 to thereby disengage contacting surface 54 from abutment portion 30 to permit inboard retraction of header retaining member 18. Contact friction between enlarged head portion 38 of header retaining member lock 32 and header retaining member 18 can serve to retain header retaining member 18 in this retracted position. In some embodiments, contacting surface 54 can be used to abut a retraction limit surface 56 (FIG. 4) formed on slot guide 20, to provide a positive stop limit for retraction.

Figure 22:
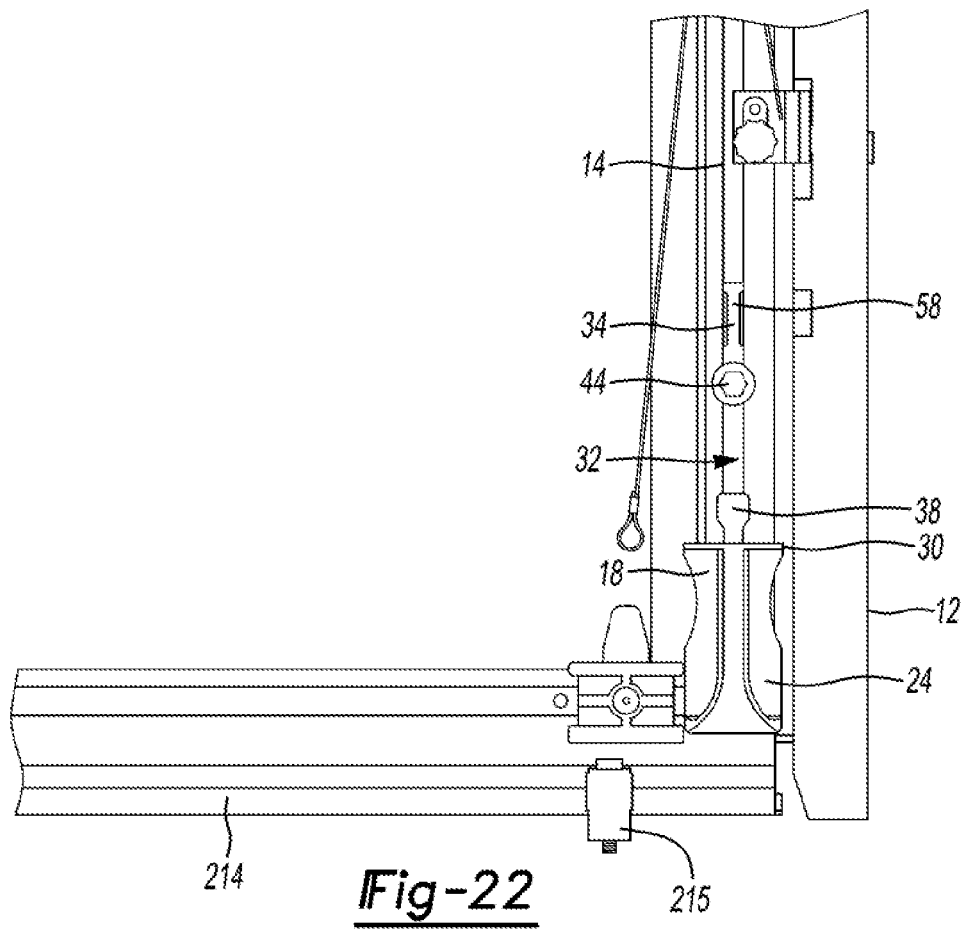
FIG. 22 is a bottom view illustrating the retainer system according to some embodiments of the present teachings.
Figure 23:
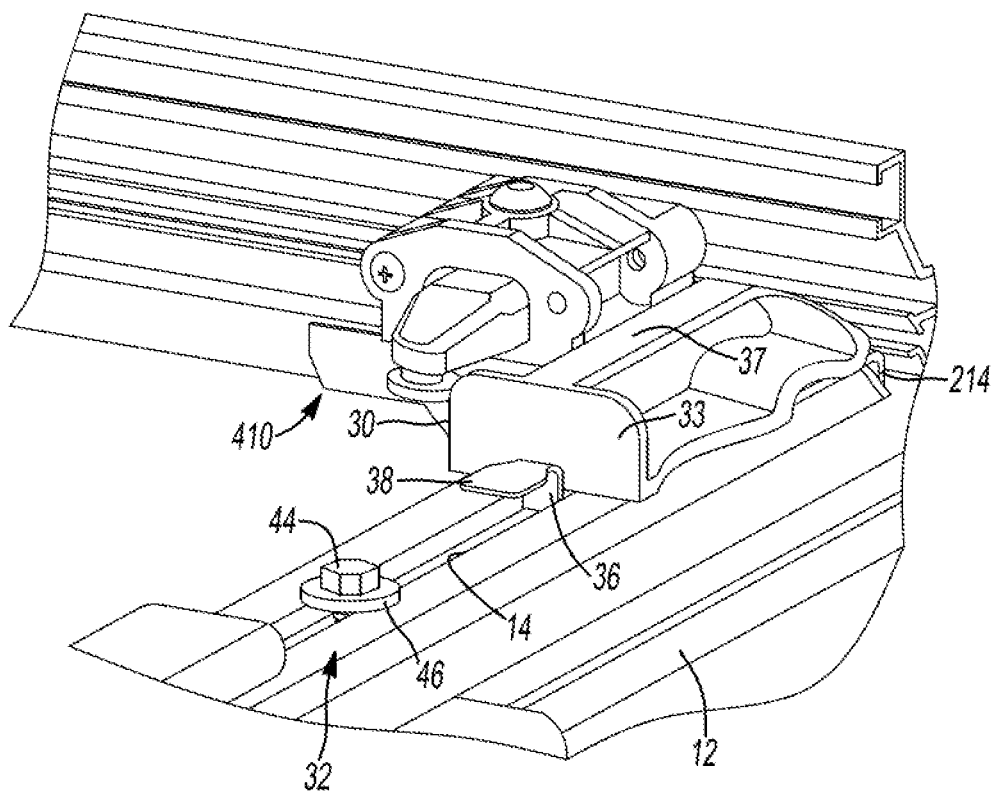
FIG. 23 is a bottom perspective view illustrating the retainer system according to some embodiments of the present teachings in a locked position.
Figure 24:
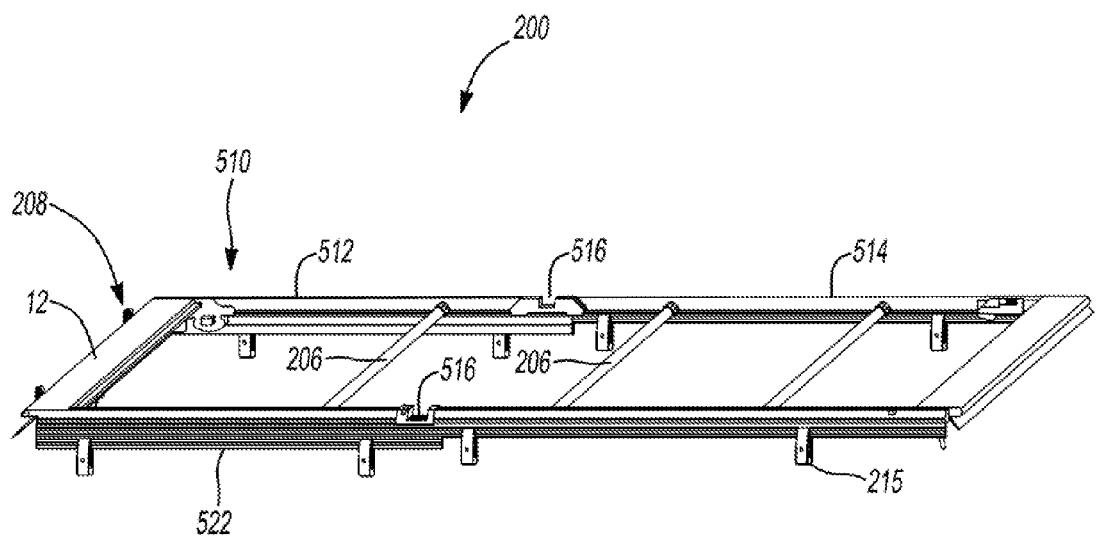
FIG. 24 is a perspective view of a tonneau system according to the principles of the present teachings with portions removed for clarity.
Figure 25:
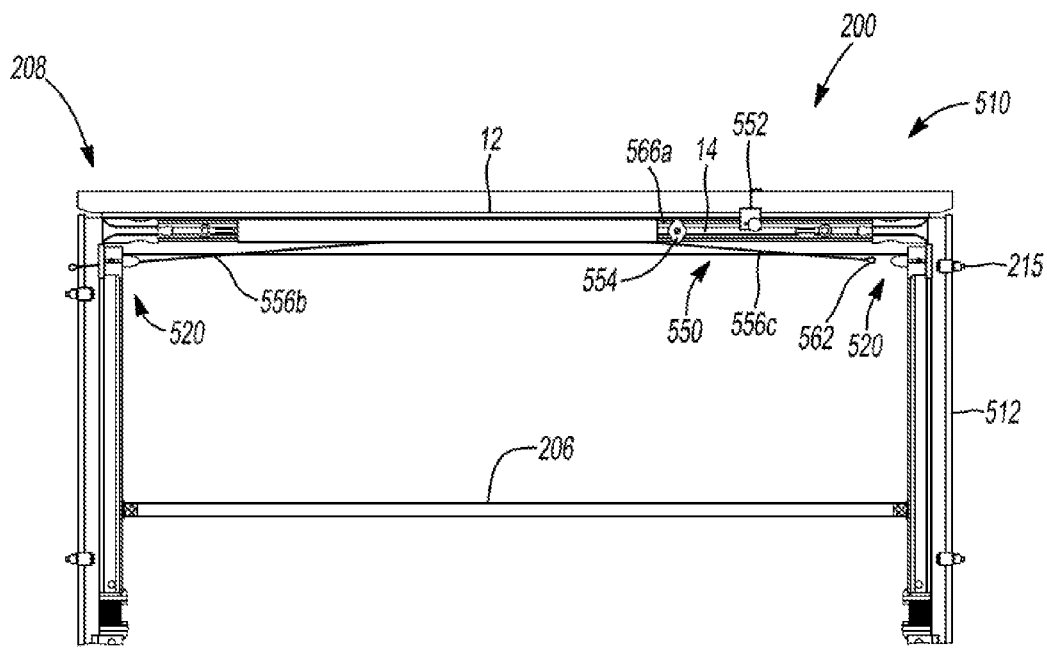
FIG. 25 is a bottom view of the tonneau system of FIG. 24.
Figure 26:
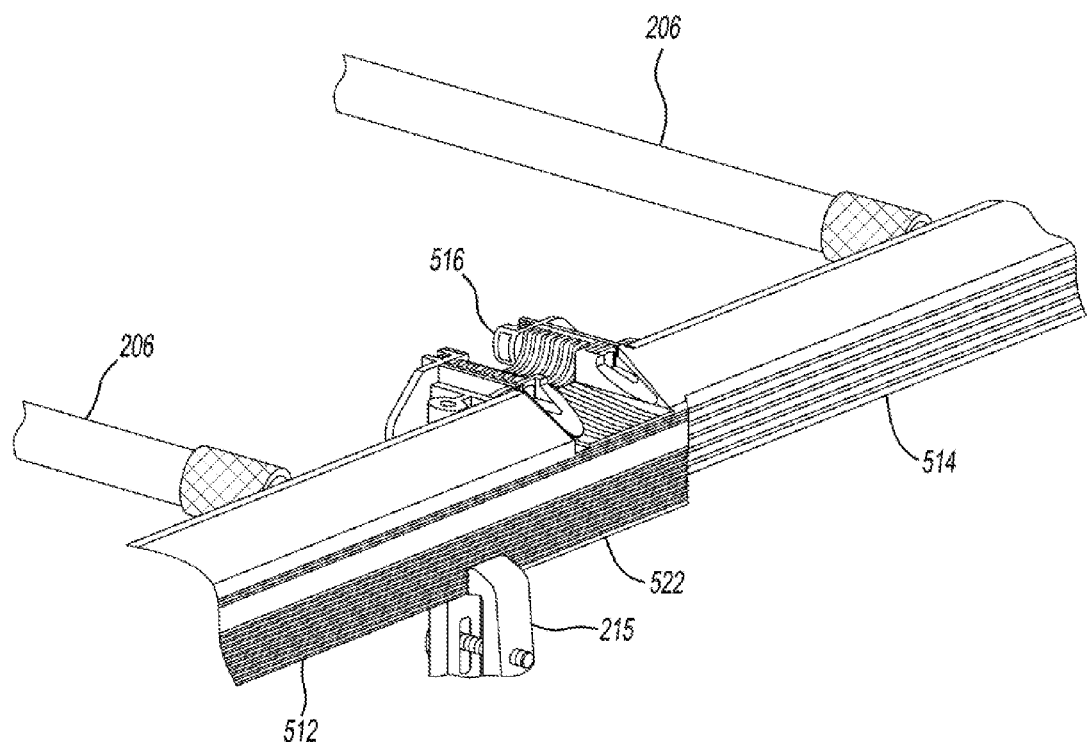
FIG. 26 is an enlarged perspective view of a hinge component of the present teachings.

As illustrated in FIGS. 4 and 22, header retaining member lock 32 can further comprise a narrowed portion 58 formed in body portion 34. Narrowed portion 58 can be used to capture and retaining a loop portion 60 of a safety strap 62. Safety strap 62 can be used to restrain or otherwise contain tonneau cover 204 when rolled-up in a retracted position. Tonneau cover 204 can thus be coupled and retained on front header 12, thereby permitting removal of tonneau cover 204 from side rails 214 (and pickup 300) when desired.

Header Installation

More particularly, during installation of tonneau cover 204 and front header 12 to side rails 214 mounted on pickup 300, front header 12 can be placed in a cross-vehicle direction such that ends of front header 12 are placed upon side rails 214. Weight of front header 12 and tonneau cover 204 can thus be carried by side rails 214, side walls 306 of pickup 300. Once front header 12 is placed on side rails 214, header retaining members 18 (in mirrored orientation on opposing ends of front header 12) are manually actuated by the user in an outward or outboard direction such that distal engaging portion 24 engages or capture a portion of side rail 218 between distal engaging portion 24 and underside 16 of front header 12. Once abutment portion 30 slides past elbow portion 34 of header retaining member lock 32, the biasing force of header retaining member lock 32 causes header retaining member lock 32 to snap downward into a locked position. In this locked position, elbow portion 36, namely contacting surface 54, contacts abutment portion 30 and prevents inboard retraction of header retaining members 18. In this position, front header 12 is firmly and safely locked into engagement with side rails 214.

During removal of tonneau cover 204 and front header 12, an opposite operation can be completed—namely, header retaining member locks 32 can be urged upward such that header retaining member locks 32 are received within channel 14. Once header retaining member locks 32 are disengaged from abutment portion 30 of header retaining members 18, header retaining members 18 can be manually slid inboard and, thus, disengaged from side rails 214. Tonneau cover 204 and front header 12 can then be removed from pickup 300.

Slam Latch System and Adapter Rail/Striker

With particular reference to FIGS. 17, 20, and 24-29, slam latch mechanism 510 will now be described in detail.

As discussed herein, in some embodiments, tonneau cover system 20 can comprise alternative tonneau cover arrangements. In some embodiments, as illustrated in FIGS. 20 and 24-26, tonneau cover system 20 can comprise two or more sections 512, 514 being pivotally coupled to each other at one or more hinge members 516. The axis of two or more hinge members 516 can be aligned and extending in a transverse (i.e. cross-vehicle) direction. In this manner, front section 512 can be pivotally raised and lowered to reveal the contents of the pickup bed, even while rear section 514 remains in a lowered, closed position. In some embodiments, rear section 514 can be configured to remain in a single position or can likewise be configured to be raised and lowered.

Although the following discussion relating to slam latch mechanism 510 is generally in reference to front section 512 and front header assembly 208, it should be understood that slam latch mechanism 510 can be used with rear section 514 and associate header structure.

Figure 27:
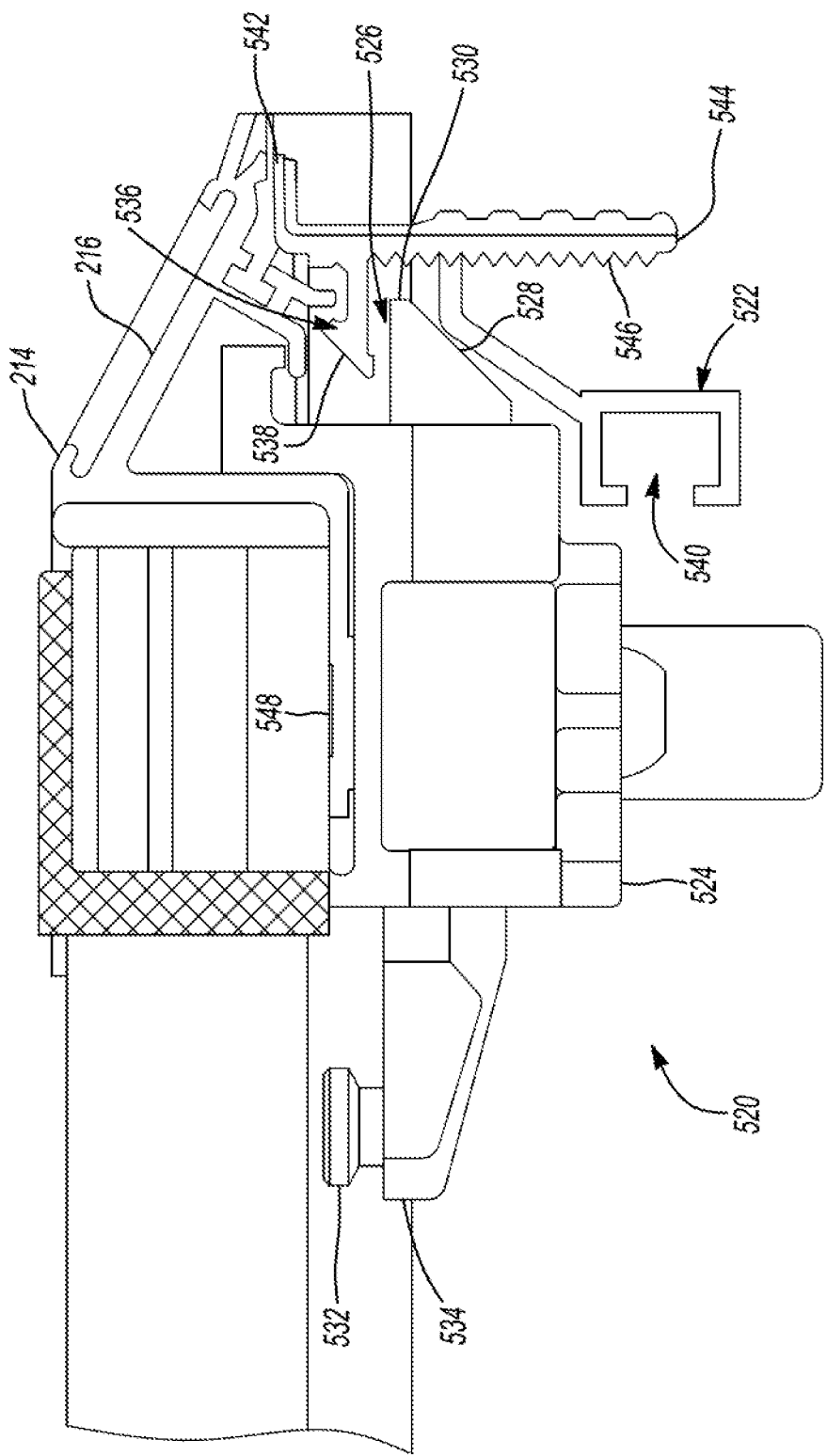
FIG. 27 is a partial cross-sectional view of a slam latch system according to the present teachings.
Figure 28:
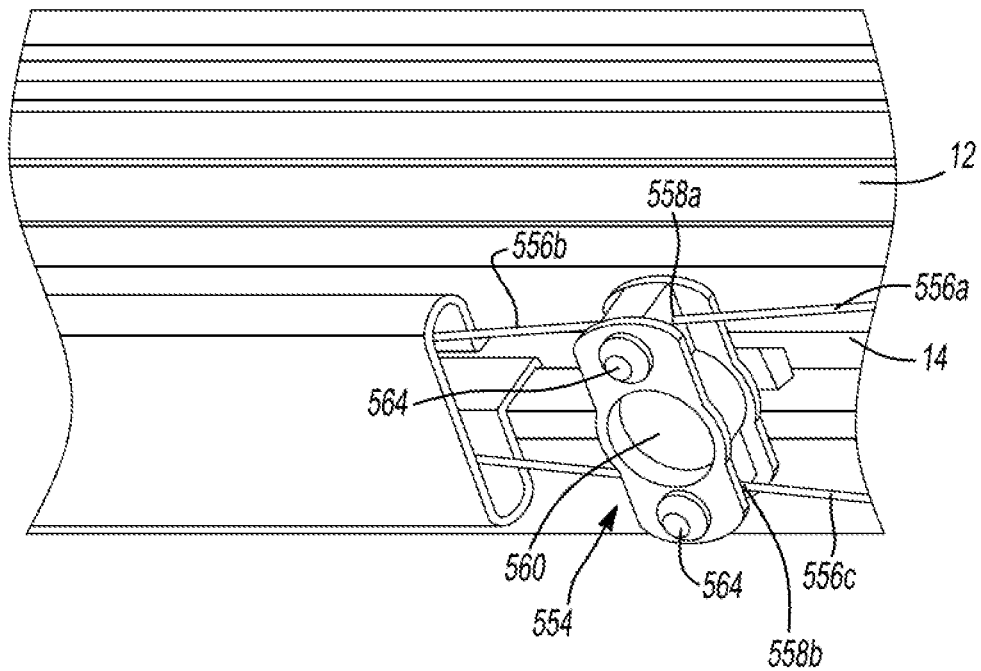
FIG. 28 is a perspective view of a rocker member of the present teachings.

In some embodiments, as illustrated in FIGS. 17, 20, 25, and 27-29, slam latch mechanism 510 can comprise one or more side latch systems 520 engageable with side rail 214 and/or an adapter rail 522. As illustrated in FIG. 27, side latch system 520 can comprise lower portion 418 of header stop portion 410 that can serve as a body portion 524 of side latch system 520. Body portion 524 can comprise a striker member 526 being slidably disposed within body portion 524 for movement in a transverse direction (i.e. cross-vehicle). Striker member 526 can move between an outboard latched position and a retracted unlatched position. Striker member 526 can be biased into the outboard latched position using a biasing member, such as a spring. Striker member 526 can include a downwardly-facing inclined cam face 528 on a distal end 530 thereof. Striker member 526 can further include a retention member (e.g. hook) 532 disposed on a proximal end 534 thereof. In some embodiments, striker member 526 can be a single unitary member and, in some embodiments, striker member 526 can comprise a plurality of members operably coupled for latching operations.

Cam face 528 is configured to operably engage a striker plate 536 formed on at least one of side rail 214 and/or adapter rail 522. Although the present teachings will be described in connection with adapter rail 522, it should be appreciated that in some embodiments adapter rail 522 can be integrally formed with side rail 214. However, in embodiments employing a separate adapter rail 522, it should be understood that the benefits of the present teachings can be easily applied as a retro-fit design to existing tonneau systems.

As illustrated in FIG. 27, striker plate 536 can include an inclined face 538 that is positioned to engage cam face 528 of striker member 526 upon closure (i.e. lowering) of front section 512 of tonneau cover system 20. Upon contact of cam face 528 of striker member 526 with inclined face 538 of striker plate 536, striker member 526 is urged, against the biasing force, into a partial retracted unlatched position permitting striker member 526 to pass to a latching side of striker plate 536. Upon passing of striker member 526 beyond striker plate 536, striker member 526 is again urged into the outboard latched position whereby striker member 526 contacts a backside of striker plate 536 preventing opening of said front section 512.

With continued reference to FIG. 27, in some embodiments as described herein, side rail 214 can be fixedly coupled to and carried by front section 512 such that side rail 214 remains with front section 512 during opening and closing thereof. In such embodiments, adapter rail 522 can be employed and fixedly coupled to side walls 306. It should be appreciated that adapter rail 522 can further provide support for cargo tie down, toolbox or container support, and the like. In some embodiments, adapter rail 522 can include one or more features, such as accessory channel 540, for use with add-on components and accessories (e.g. toolboxes, etc.). Adapter rail 522 can comprise a first overhang portion 542 sized to engage and reside along surface 312 of side walls 306. A downwardly extending portion 544 can extend from overhang portion 542 and abut an inner surface of side walls 306. Striker plate 536 can extend inboard from downwardly extending portion 544. Downwardly extending portion 544 can further include channel 540 and a plurality of notches 546 for engagement with clamp assembly 215. In such embodiments, side rail 214 can comprise a capture portion 548 extending inboard and captured or coupled with side latch system 520.

In some embodiments, slam latch mechanism 510 further comprises an actuation system 550 having an actuation lever 552, a rocker member 554, a plurality of cables 556. With particular reference to FIGS. 17, 25, 28, and 29, actuation system 550 is illustrated for manual actuation from a central position of any number of side latch systems 520. Actuation system 550 can be coupled via a first cable 556a to rocker member 554. First cable 556a can be captured and retained within a first slot 558a formed in rocker 554. Rocker 554 can be coupled to channel 14 via a fastener 560. First cable 556a can continue through rocker 554 and extend toward side latch system 520 as second cable 556b. It should be understood that first cable 556a and second cable 556b can be a single unitary cable or can comprise two or more cables. Second cable 556b can terminate at a loop 562 (FIG. 20) sized to be captured over retention member 532 of striker member 526 to aid in quick attachment and detachment of second cable 556b from striker member 526. A third cable 556c can extend from a second slot 558b formed in rocker 554. First slot 558a and second slot 558b can comprise retaining features or fasteners 564 for providing a clamping force to retain cable 556. In this way, the positioning of cable 556 can be adjusted relative to rocker 554 by loosening and adjusting cable 556 therein and then retightening fasteners 564. Cable 556c can then likewise terminate at a loop 562 sized to be captured over retention member 532 of a second striker member 526 on an opposing side of the tonneau cover system to aid in quick attachment and detachment of third cable 556c from striker member 526.

Figure 29:
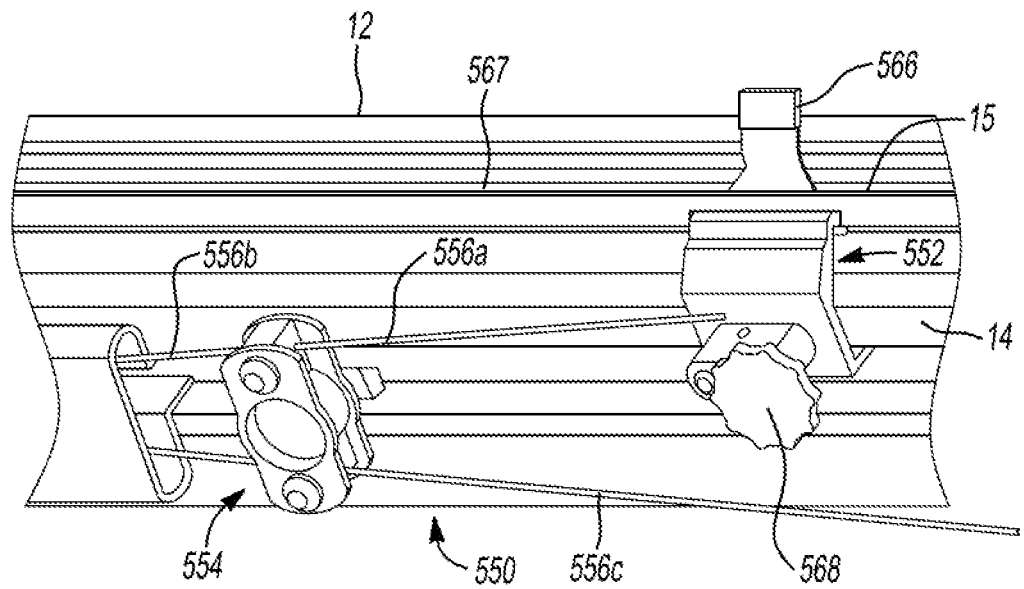
FIG. 29 is a perspective view of an actuation lever of the present teachings.
Figure 30:
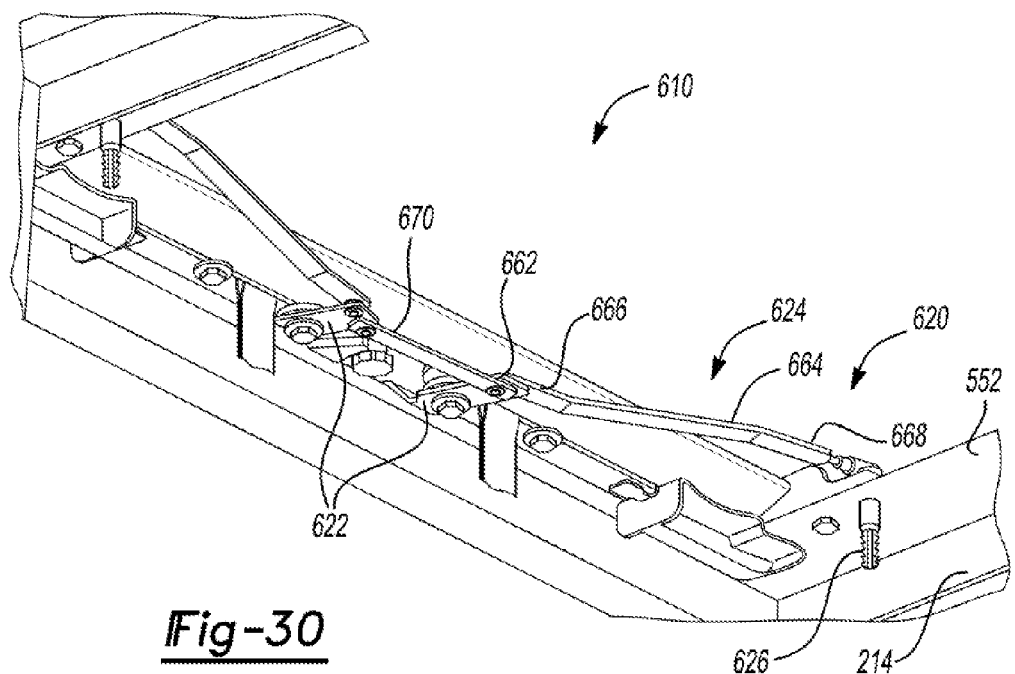
FIG. 30 is a bottom perspective view of a ratchet latch system according to the principles of the present teachings with portions removed for clarity.
Figure 31:
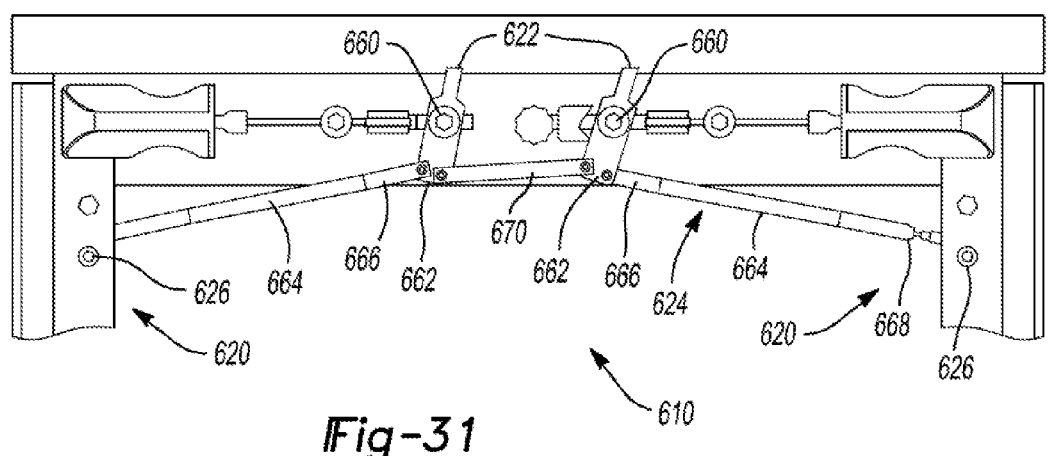
FIG. 31 is a bottom view of the ratchet latch system of FIG. 30.
Figure 32:
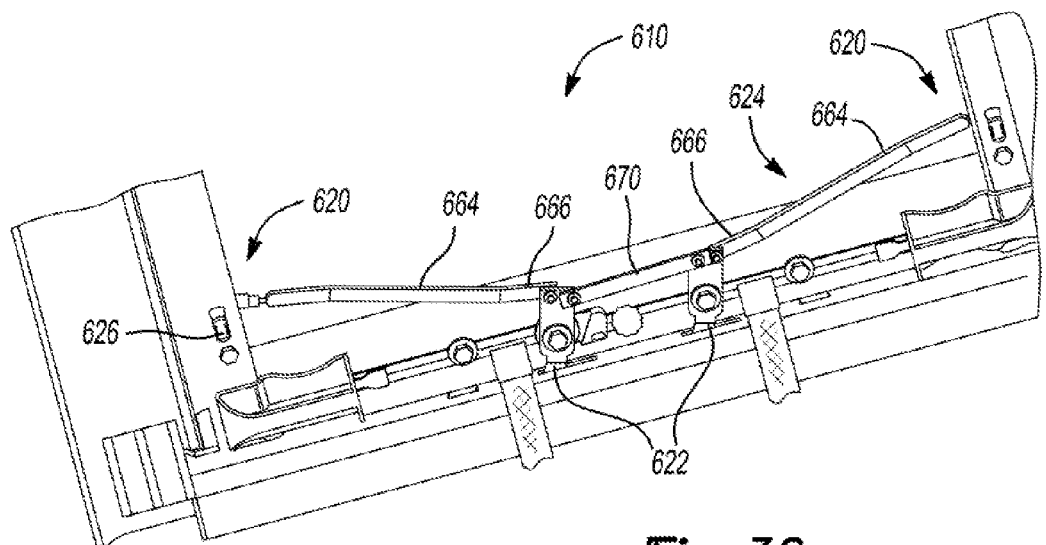
FIG. 32 is a bottom perspective view of the ratchet latch system of the present teachings.

As illustrated in FIG. 29, actuation lever 552 can comprise a grasping portion 566 extending above a portion of front header 12 that is sized to be grasped by a user. Actuation lever 552 is partially received within channel 14 and extends along a secondary channel 15 to permit sliding movement relative thereto. Secondary channel 15 can include a front header seal 567 for sealing front header 12 against environmental elements. This seal 567 can include a notch cut therein to permit actuation of actuation lever 552. As a user moves actuation lever 552 to an outboard position, tension is exerted upon first cable 556a thereby causing rocker member 554 to rotate about its axis resulting in application of a tensile force upon second cable 556b and third cable 556c. This tensile force is sufficient to overcome the biasing force of striker members 526, thereby retracting striker member 526 to a position inboard of striker plate 536 permitting front section 512 to be pivoted upwardly into an opened position. Once striker member 526 is clear of striker plate 536, actuation lever 552 can be released by the user. In order to close front section 512, the user can simply lower or other slam front section 512, thereby causing striker member 526 to contact striker plate 536 and deflect inboard until striker member 526 is below striker plate 536 at which time striker member 526 can extend outboard under its biasing force into the latched position. The biasing force of striker member 526 can be sufficient to overcome any latent frictions in the system, thereby serving to reset the system (e.g. recenter rocker member 554 and reset actuation lever 552). In some embodiments, actuation lever 552 can comprise a locking knob 568 operable to screw in to engage an underside of front header 12 to provide frictional resistance to prevent inadvertent or unauthorized retraction of actuation lever 552.

Ratchet Latch System

With particular reference to FIGS. 30-36, ratchet latch mechanism 610 will now be described in detail.

As discussed herein, in some embodiments, tonneau cover system 20 can comprise alternative tonneau cover arrangements. In some embodiments, as illustrated in FIGS. 20 and 24-26, tonneau cover system 20 can comprise two or more sections 512, 514 being pivotally coupled to each other at one or more hinge members 516. The axis of two or more hinge members 516 can be aligned and extending in a transverse (i.e. cross-vehicle) direction. In this manner, front section 512 can be pivotally raised and lowered to reveal the contents of the pickup bed, even while rear section 514 remains in a lowered, closed position. In some embodiments, rear section 514 can be configured to remain in a single position or can likewise be configured to be raised and lowered.

Although the following discussion relating to ratchet latch mechanism 610 is generally in reference to front section 512 and front header assembly 208, it should be understood that ratchet latch mechanism 610 can be used with rear section 514 and associate header structure. Moreover, in some embodiments, ratchet latch mechanism 610 can be used with additional tonneau cover configurations, including soft and/or rolled tonneau covers.

In some embodiments, as illustrated in FIGS. 30-36, ratchet latch mechanism 610 can comprise one or more side latch systems 620 engageable between side rail 214 and adapter rail 522. The one or more side latch systems 620 can be operably coupled to one or more actuation levers 622 via a drive linkage system 624. Drive linkage system 624 can be used to actuate the one or more side latch systems 620 in response to user manipulation of the one or more actuation levers 622, as will be described herein.

Figure 33:
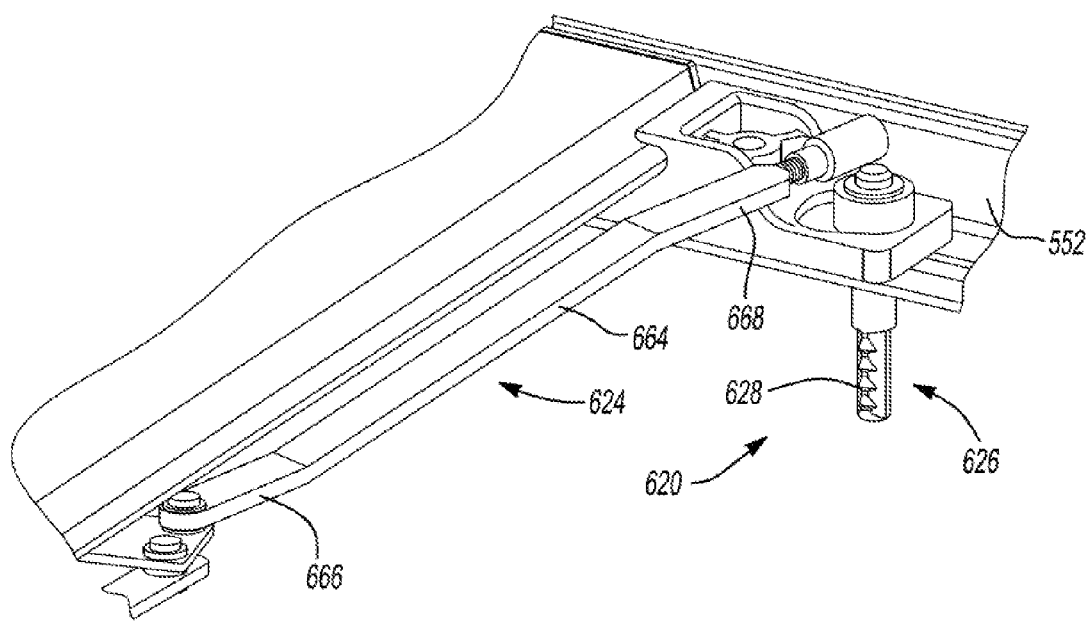
FIG. 33 is an enlarged perspective view of the ratchet latch system according to the present teachings.
Figure 35:
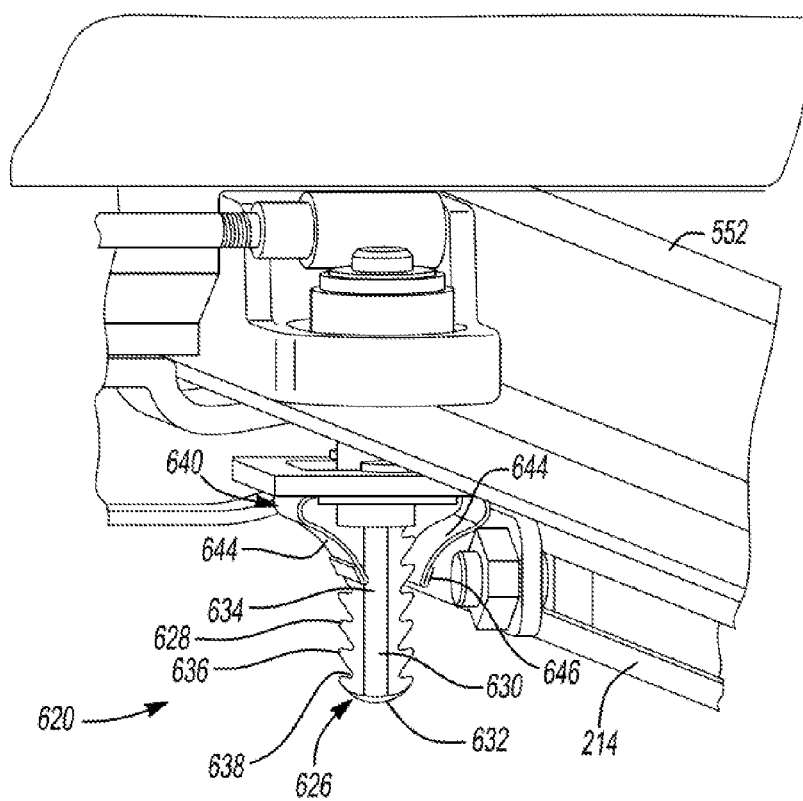
FIG. 35 is an enlarged perspective view of the ratchet latch system according to the present teachings.
Figure 36:
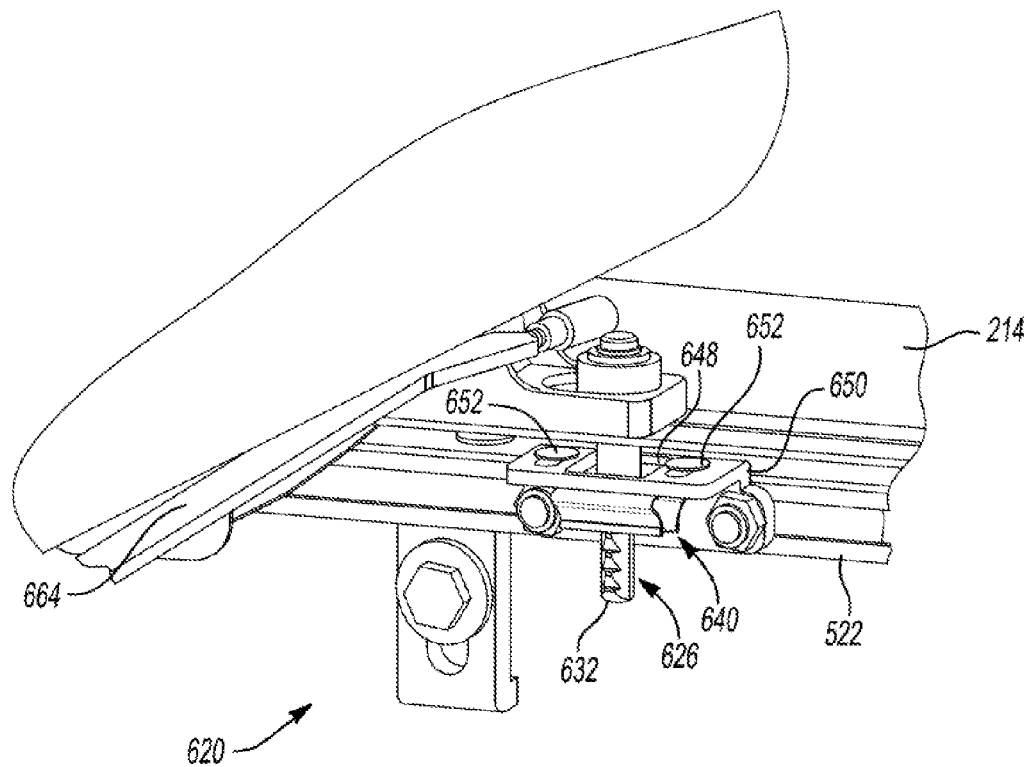
FIG. 36 is an enlarged perspective view of the ratchet latch system according to the present teachings.
Figure 37A:
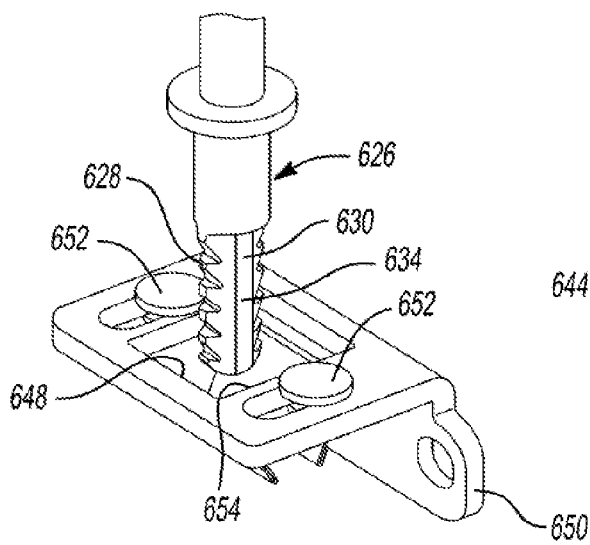
FIGS. 37A and 37B are enlarged side views of the ratchet latch system in a ratchet engaging position.
Figure 37B:
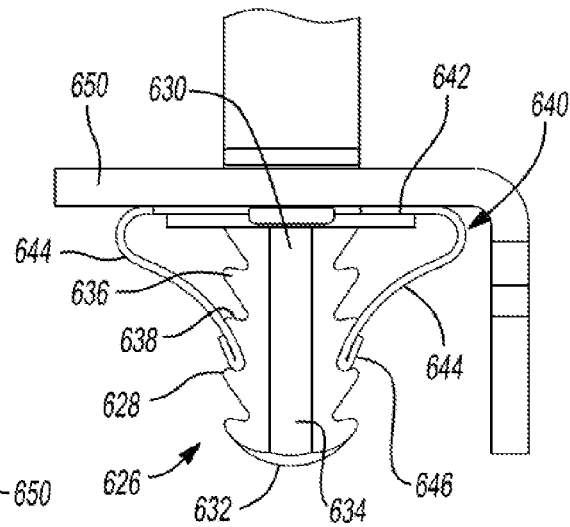

With particular reference to FIGS. 35 and 36, side latch system 620 can comprise ratchet striker member 626 having ratcheted serrations 628 extending along a length thereof. That is, in some embodiments, ratchet striker member 626 can comprise a generally elongated member having a main body 630 extending to and terminating at a distal tip 632. As can be seen in FIGS. 33, 35, and 36, ratcheted serrations 628 can be disposed along opposing sides of main body 630 such that a first portion of ratcheted serrations are disposed along a length of main body 630 and a second portion of ratcheted serrations are disposed along the length of main body 630 and spaced 180 degrees about main body 630. In this way, the first portion and second portion of ratcheted serrations 628 are separated from each other by generally smooth transition portions 634. In some embodiments, generally smooth transition portions 634 can comprise a generally planar surface. Ratchet striker member 626 can be pivotally mounted and secured within header stop member 410 (or other body portion or member).

Each of the ratcheted serrations 628 are shaped to define a plurality of outwardly directed prong members 636 each being separated by recesses 638. Prong members 636 and recesses 638 are sized to positively engage a ratchet receiving member, such as a ratchet spring dip 640, at any one of the plurality of locations defined by a prong member and/or recess.

With continued reference to FIGS. 35 and 36, ratchet spring clip 640 can be used for selectively engaging ratchet striker member 626 to define a locking or latched engagement. Specifically, in some embodiments, ratchet spring clip 640 can comprise a base portion 642 having a pair of downwardly-extending, inwardly-directed leg members 644. Leg members 644 can be spring-biased into a direction toward each other to define a clamping orientation. Leg members 644 can each comprise a distal end 646 being shaped and sized to slidably move over prong members 636 of ratchet striker member 626 as ratchet striker member 626 is slidably inserted through ratchet spring clip 640. In this way, leg members 644 are outwardly deflected in response to passage of opposing prong members 636 and then elastically retract (e.g. biased inwardly) in response to passage of opposing recesses 638 such that distal ends 646 of leg members 644 engage recesses 638 to prevent removal. That is, prong members 636 and recesses 638 are shaped and sized to inhibit removal of ratchet striker member 626 from ratchet spring clip 640 once distal ends 646 are engaged in recesses 638.

As illustrated in FIGS. 35-38B, ratchet spring clip 640 comprises an aperture 648 formed in base portion 642 through which ratchet striker member 626 extends. As can be seen in FIGS. 36 and 37A, aperture 648 can be oversized or otherwise shaped to permit ratchet striker member 626 to pass therethrough irrespective of lateral (e.g. cross-vehicle) misalignment. It should also be understood that in some embodiments aperture 648 can be enlarged relative to ratchet striker member 626 to permit misalignment in both lateral (e.g. cross-vehicle) and longitudinal (e.g. vehicle fore-aft) directions.

In some embodiments, as illustrated in FIGS. 36-38B, ratchet spring clip 640 is coupled to side rail 214 (at least indirectly) via a spring clip bracket 650. In some embodiments, spring clip bracket 650 can be generally L-shaped and fixedly coupled to adapter rail 522 (or directly to side rail 214, in some embodiments) via a plurality of fasteners. Ratchet spring clip 640 can be coupled to spring clip bracket 650 via a pair of integrally formed mounting rivets 652 slidably disposed and captured within mounting slots 654 formed in spring clip bracket 650. Each of the mounting rivets 652 can comprise an enlarged head portion that permits camming engagement of ratchet spring clip 640 relative to spring clip bracket 650 to accommodate lateral (e.g. cross-vehicle) misalignment of ratchet striker member 626 and ratchet spring clip 640.

Upon engagement of ratchet striker member 626 with ratchet spring clip 640, leg members 644 engage recesses 638 to inhibit removal of ratchet striker member 626 from ratchet spring clip 640. Ratchet striker member 626 is pivotally coupled to side rail 214 such that engagement of ratchet striker member 626 with ratchet spring clip 640, effectively joins and/or locks adapter rail 522 to side rail 214. This arrangement thus couples tonneau cover system 200 to the sidewalls of the pickup bed.

It should be understood that the present ratchet latch mechanism 610 permits retaining of tonneau cover system 200 along three axis, namely, in a lateral (e.g. cross-vehicle) direction, a longitudinal (e.g. vehicle fore-aft) direction, and a vertical direction. Specifically with regard to the vertical direction, it should be understood that the ratchet latch mechanism 610 permits variable adjustment to accommodate variations to ensure a tight closure fit in all assemblies.

As illustrated in FIGS. 37A-38B, ratchet latch mechanism 610 is positionable between a ratchet engaging position (see FIGS. 37A and 37B) and a ratchet disengaging position (see FIGS. 38A and 38B). More particularly, to release engagement of ratchet striker member 626 from ratchet spring clip 640, ratchet latch mechanism 610 is configured to permit rotation of ratchet striker member 626 about its longitudinal axis such that ratcheted serrations 628 are disengaged from distal ends 646 of ratchet spring clip 640. That is, ratchet striker member 626 is pivotable (about 90 degrees) along its longitudinal axis such that generally smooth transition portions 634 disposed between the first and second portions of ratcheted serrations 628 rotate into a position adjacent distal ends 646 to disengage ratcheted serrations 628 from ratchet spring clip 640 and permit retraction or withdrawal of ratchet striker member 626 from ratchet spring clip 640. In this way, distal ends 646 slide along smooth transition portions 634.

Figure 34:
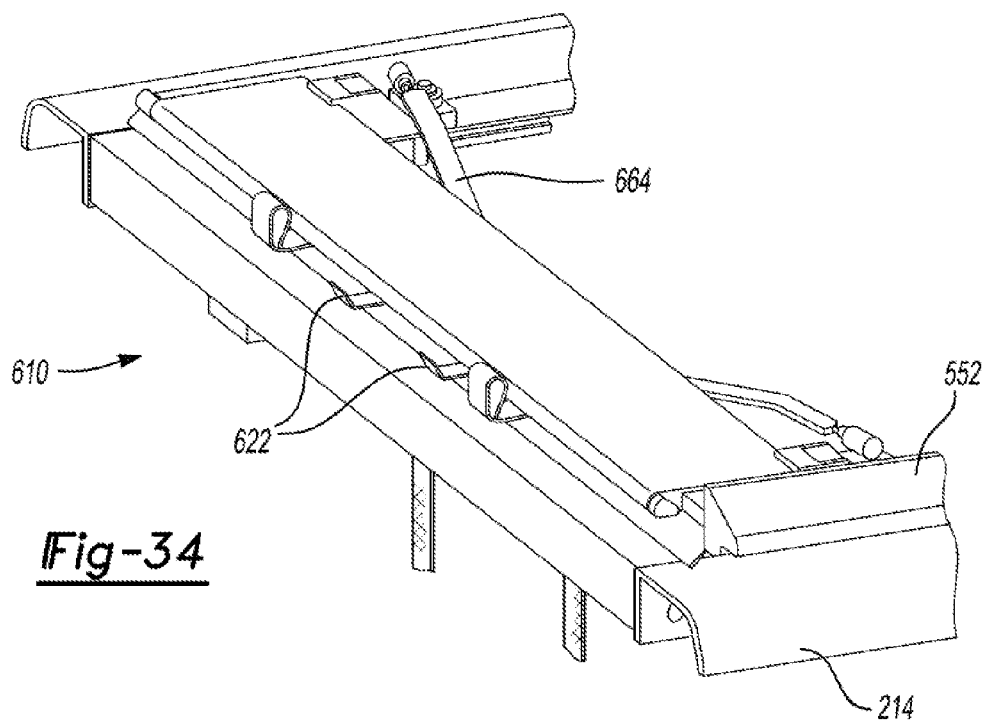
FIG. 34 is a front view of the ratchet latch system of the present teachings.

To achieve pivoting rotation of ratchet striker member 626, in some embodiments, the one or more side latch systems 620 are operably coupled to one or more actuation levers 622 via drive linkage system 624. Drive linkage system 624 is used to actuate the one or more side latch systems 620 in response to user manipulation of the one or more actuation levers 622. Specifically, as illustrated in FIGS. 30-34, actuation levers 622 are provided and accessible by a user from one or more locations. In some embodiments, as illustrated in FIG. 34, two actuation levers 622 can be provided such that each is accessible from opposing sides of the pickup truck. Actuation levers 622 can each be actuated in a sliding movement generally in a lateral (e.g. cross-vehicle) direction. As seen in FIGS. 30-33, this sliding movement of actuation levers 622 causes rotation of actuation levers 622 above a pivot point 660, which results in movement at an opposing end 662 of actuation levers 622. Drive linkage system 624 can, in some embodiments, include actuation levers 622. Drive linkage system 624 can further include drive members 664. Each drive member 664 can be pivotally coupled between opposing end 662 of one of the actuation levers 622 and the corresponding one of the side latch systems 620. Specifically, drive member 664 can comprise a generally longitudinal member having a first end 666 pivotally coupled to opposing end 662 of actuation lever and a second end 668 pivotally coupled to ratchet striker member 626. In some embodiments, second end 668 of drive member 664 can be pivotally coupled to ratchet striker member 626 via a quick coupler. In some embodiments, quick coupler can comprise a ball-socket attachment to permit application of a torsional force to rotate ratchet striker member between the engaged position and the released position.

In some embodiments, drive linkage system 624 can further comprise a center link 670 operably coupling opposing ends 662 of each actuation lever 622 such that actuation of one actuation lever 622 causes slidable movement of the other actuation lever 622, thereby requiring a user to actuate only one actuation lever 622 in order to release both side latch systems 620.

Although the ratchet latch system has been described in connection with the illustrated embodiment, it should be understood that the ratchet latch system can comprise variations, such as, but not limited to, alternative orientations of components (e.g. the placement of ratchet spring clip 640 ratchet striker member 626 can be reversed such that ratchet spring clip 640 is carried by the tonneau cover), alternative shapes and configurations (e.g. shape of ratchet spring clip 640), and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau system for a pickup bed, said tonneau system comprising:
 a bracket system connectable with a side wall of the pickup bed, said bracket system having a ratchet receiving member;
 a tonneau cover assembly having at least a first cover section and a second section, said first cover section being pivotally coupled to said second section;
 a latching system operably coupled between said first cover section and said bracket system, said latching system having a ratchet striker member operably coupled to said first cover section and positionable between a ratchet engaging position and a ratchet disengaging position, said ratchet striker member being selectively engageable with said ratchet receiving member of said bracket system in said ratchet engaging position to define a latched condition of said first cover section of said tonneau cover assembly relative to said bracket system, said ratchet striker member being disengageable from said ratchet receiving member in said ratchet disengaging position to define an unlatched condition of said first cover section of said tonneau cover assembly relative to said bracket system; and
 an actuation system operably coupled to said latching system, said actuation system having an actuation lever operably coupled to a drive member, said drive member being coupled to said latching system, said drive member pivoting said ratchet striker member between said ratchet engaging position and said ratchet disengaging position in response to actuation of said actuation lever.

2. The tonneau system according to claim 1 wherein said bracket system comprises an adapter rail member connectable with the side wall of the pickup bed, said adapter rail having said ratchet receiving member extending therefrom, said ratchet receiving member having a pair of leg members engageable with said ratchet striker member when said ratchet striker member is in said ratchet engaging position, said pair of leg members of said ratchet receiving member disengageable from said ratchet striker member when said ratchet striker member is in said ratchet disengaging position.

3. The tonneau system according to claim 2 wherein said adapter rail member comprises an accessory channel for supporting accessory components thereon.

4. The tonneau system according to claim 2 wherein said adapter rail member comprises an overhang portion engageable with a top surface of the side wall of the pickup bed and a downwardly extending portion extending from said overhang portion, said downwardly extending portion being generally adjacent an inner wall surface of the side wall of the pickup bed.

5. The tonneau system according to claim 1 wherein said latching system comprises:
 a body portion coupled to said first cover section of said tonneau cover assembly, said ratchet striker member being pivotally coupled with said body portion, said ratchet striker member being biased into said ratchet engaging position.

6. The tonneau system according to claim 1 wherein said ratchet striker member comprises an elongated body having a plurality of ratchet features formed along a first longitudinal side of said elongated body and a smooth section free of said ratchet features formed along a second longitudinal side of said elongated body.

7. The tonneau system according to claim 6 wherein at least one of said plurality of ratchet features engage said ratchet receiving member in said ratchet engaging position to inhibit disengagement of said ratchet striker member from said ratchet receiving member and said smooth section engages said ratchet receiving member in said ratchet disengaging position to permit disengagement of said ratchet striker member from said ratchet receiving member.

8. The tonneau system according to claim 1 wherein said drive member is operably coupled to said ratchet striker member, wherein actuation of said actuation lever causes a translational movement of said drive member thereby exerting a rotational force upon said ratchet striker member to move said ratchet striker member into said ratchet disengaging position.

9. The tonneau system according to claim 8 wherein said actuation lever is operably coupled to said drive member via a first pivot connection and said drive member is operably coupled to said ratchet striker member via a second pivot connection.

10. The tonneau system according to claim 8 wherein said ratchet striker member is biased into said ratchet engaging position, said biasing being sufficient to return said actuation lever and said drive member to an initial position following said actuation of said actuation lever.

11. The tonneau system according to claim 1 wherein said ratchet striker member comprises an elongated body having a first plurality of ratchet features formed along a first longitudinal side of said elongated body and a second plurality of ratchet features formed along a second longitudinal side of said elongated body, said first longitudinal side and said second longitudinal side being space apart from each other by a smooth section free of said ratchet features formed along said elongated body.

12. The tonneau system according to claim 11 wherein said first and second plurality of ratchet features comprise a plurality of prong members having a plurality of recesses disposed between each of said plurality of prong members.

13. The tonneau system according to claim 11 wherein said ratchet receiving member comprises a pair of inwardly-directed leg members having distal ends, at least one of said first and second plurality of ratchet features of said ratchet striker member engages said distal ends of said pair of inwardly-directed leg members of said ratchet receiving member in said ratchet engaging position to inhibit disengagement of said ratchet striker member from said ratchet receiving member, said smooth section engages said distal ends of said pair of inwardly-directed leg members of said ratchet receiving member in said ratchet disengaging position to permit disengagement of said ratchet striker member from said ratchet receiving member.

14. The tonneau system according to claim 1 wherein said ratchet striker member is selectively engageable with said ratchet receiving member of said bracket system at any one of a plurality of vertical positions in said ratchet engaging position to define a latched condition.

15. The tonneau system according to claim 1 wherein said ratchet striker member being selectively engageable with said ratchet receiving member of said bracket system in said ratchet engaging position to define a latched condition comprises said ratchet striker member being selectively engageable with said ratchet receiving member of said bracket system in any one of a plurality of vertical ratchet positions.

16. A tonneau system for a pickup bed, said tonneau system comprising:
a bracket system connectable with a side wall of the pickup bed, said bracket system having a ratchet receiving member;
a tonneau cover;
a latching system for coupling the tonneau cover to the bracket system, said latching system having a ratchet striker member operably coupled to said tonneau cover and comprising a plurality of prongs, said ratchet striker member being receivable in said ratchet receiving member and pivotable between a ratchet engaging position wherein the ratchet receiving member engages at least one of the plurality of prongs to latch the tonneau cover to the bracket system and a ratchet disengaging position wherein the ratchet receiving member is disengaged from the plurality of prongs to permit the ratchet striker member of the latching system to be withdrawn from the ratchet receiving member of said bracket system; and
an actuation system including a grasping portion operable to pivot the ratchet striker member between said ratchet engaging position and said ratchet disengaging position.

17. The tonneau system according to claim 16 wherein said ratchet striker member comprises an elongated body with the plurality of prongs formed along a first longitudinal side of said elongated body and a smooth section free of the plurality of prongs formed along a second longitudinal side of said elongated body.

18. The tonneau system according to claim 16 wherein the ratchet striker member comprises an elongated body with the plurality of prongs formed along first and second opposite longitudinal sides of said elongated body and a smooth section free of the plurality of prongs formed along longitudinal sides between the first and second opposite longitudinal sides of said elongated body.

19. The tonneau system according to claim 16 wherein the grasping portion extends to be accessible outside the tonneau cover when the tonneau system is in an extended position covering the pickup bed.

20. The tonneau system according to claim 16 wherein said ratchet receiving member comprises at least one inwardly-directed leg member having a distal end positioned to engage one of the plurality of prongs of said ratchet striker member when the latching system is in the ratchet engaging position, and the distal end being positioned away from the prongs to avoid engagement with the plurality of prongs when the latching system is in the ratchet disengaging position.

21. The tonneau system according to claim 16 wherein a lever comprises the grasping portion.

22. The tonneau system according to claim 16 wherein the grasping portion extends to be accessible outside the tonneau cover along an edge of a header extending away from the side wall when the header is coupled to the bracket system and the bracket system is coupled to the side wall and the tonneau cover is in an extended position covering the pickup bed.

23. The tonneau system according to claim 16 wherein the ratchet striker member is biased into the ratchet engaging position, and the biasing is sufficient to reset the actuation system after movement into the ratchet disengaging position.

24. The tonneau system according to claim 16 wherein the ratchet striker member comprises an elongated body with the plurality of prongs extending along a longitudinal side of the elongated body, and wherein the ratchet receiving member positively engages the plurality of prongs at any one of a plurality of longitudinal locations to accommodate fit variations.

* * * * *